US012277301B2

(12) United States Patent
Gu et al.

(10) Patent No.: US 12,277,301 B2
(45) Date of Patent: Apr. 15, 2025

(54) URL ACCESS TO ASSETS WITHIN AN ARTIFICIAL REALITY UNIVERSE ON BOTH 2D AND ARTIFICIAL REALITY INTERFACES

(71) Applicant: Meta Platforms Technologies, LLC, Menlo Park, CA (US)

(72) Inventors: Wenjin Gu, Markham (CA); Austen McRae, Coronado, CA (US); George Ortiz, Belmont, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 136 days.

(21) Appl. No.: 17/820,707

(22) Filed: Aug. 18, 2022

(65) Prior Publication Data
US 2024/0061545 A1 Feb. 22, 2024

(51) Int. Cl.
*G06T 19/00* (2011.01)
*G06F 3/04815* (2022.01)
*G06F 16/955* (2019.01)

(52) U.S. Cl.
CPC ...... *G06F 3/04815* (2013.01); *G06F 16/9566* (2019.01); *G06T 19/006* (2013.01)

(58) Field of Classification Search
None
See application file for complete search history.

(56) References Cited

U.S. PATENT DOCUMENTS

| 6,842,175 B1 | 1/2005 | Schmalstieg et al. |
| 7,701,439 B2 | 4/2010 | Hillis et al. |
| 8,424,075 B1 | 4/2013 | Walsh et al. |
| D683,749 S | 6/2013 | Hally |

(Continued)

FOREIGN PATENT DOCUMENTS

| CN | 101996077 A | 3/2011 |
| EP | 3719616 A1 | 10/2020 |

(Continued)

OTHER PUBLICATIONS

Art is my weapon, "V1 VR NFT Art Gallery is Live!", https://www.youtube.com/watch?v=BMfLjrkpGb0, Jan. 19, 2022. (Year: 2022).*

(Continued)

*Primary Examiner* — Nicholas R Wilson
(74) *Attorney, Agent, or Firm* — Potomac Law Group, PLLC; Dannon G. Allbee

(57) ABSTRACT

Implementations are directed to uniform resource locator (URL) access to assets within an artificial reality universe on both two-dimensional (2D) and artificial reality (XR) interfaces. Implementations can use a uniform URL schema to represent the asset, the URL being semantically meaningful and reflective of the hierarchical structure of the location of the asset within the XR universe. Accessing the URL from a 2D interface can lead the user to a landing page from which the user can choose to continue and visit the world from the 2D interface, or to instead visit the world from an XR interface. When accessing the URL from the XR interface, the user can see prefetched information regarding the destination that is automatically presented to the user in a sensible manner, such as in a rendering of a travel portal, which the user can activate to render the destination.

20 Claims, 13 Drawing Sheets

(56) References Cited

U.S. PATENT DOCUMENTS

| | | |
|---|---|---|
| D689,874 S | 9/2013 | Brinda et al. |
| 8,947,351 B1 | 2/2015 | Noble |
| D726,219 S | 4/2015 | Chaudhri et al. |
| D727,352 S | 4/2015 | Ray et al. |
| D727,354 S | 4/2015 | Park et al. |
| D733,740 S | 7/2015 | Lee et al. |
| 9,117,274 B2 | 8/2015 | Liao et al. |
| 9,292,089 B1 | 3/2016 | Sadek |
| D761,273 S | 7/2016 | Kim et al. |
| D763,279 S | 8/2016 | Jou |
| 9,477,368 B1 | 10/2016 | Filip et al. |
| D775,179 S | 12/2016 | Kimura et al. |
| D775,196 S | 12/2016 | Huang et al. |
| D780,794 S | 3/2017 | Kisielius et al. |
| D781,905 S | 3/2017 | Nakaguchi et al. |
| D783,037 S | 4/2017 | Hariharan et al. |
| D784,394 S | 4/2017 | Laing et al. |
| D784,395 S | 4/2017 | Laing et al. |
| D787,527 S | 5/2017 | Wilberding |
| D788,136 S | 5/2017 | Jaini et al. |
| D788,793 S | 6/2017 | Ogundokun et al. |
| D789,416 S | 6/2017 | Baluja et al. |
| D789,977 S | 6/2017 | Mijatovic et al. |
| D790,567 S | 6/2017 | Su et al. |
| D791,823 S | 7/2017 | Zhou |
| D793,403 S | 8/2017 | Cross et al. |
| 9,817,472 B2 | 11/2017 | Lee et al. |
| D817,994 S | 5/2018 | Jou |
| D819,065 S | 5/2018 | Xie et al. |
| D824,951 S | 8/2018 | Kolbrener et al. |
| D828,381 S | 9/2018 | Lee et al. |
| D829,231 S | 9/2018 | Hess et al. |
| D831,681 S | 10/2018 | Eilertsen |
| D835,665 S | 12/2018 | Kimura et al. |
| 10,168,768 B1 | 1/2019 | Kinstner |
| D842,889 S | 3/2019 | Krainer et al. |
| 10,220,303 B1 | 3/2019 | Schmidt et al. |
| 10,248,284 B2 | 4/2019 | Itani et al. |
| D848,474 S | 5/2019 | Baumez et al. |
| D850,468 S | 6/2019 | Malahy et al. |
| D851,123 S | 6/2019 | Turner |
| D853,431 S | 7/2019 | Sagrillo et al. |
| D854,551 S | 7/2019 | Pistiner et al. |
| D856,366 S | 8/2019 | Richardson |
| D859,426 S | 9/2019 | Poes |
| 10,473,935 B1 | 11/2019 | Gribetz et al. |
| 10,521,944 B2 | 12/2019 | Sareen et al. |
| 10,592,064 B2 | 3/2020 | Ames et al. |
| 10,665,019 B2 | 5/2020 | Hildreth et al. |
| D888,071 S | 6/2020 | Wilberding |
| D900,123 S | 10/2020 | Lopes |
| D908,713 S | 1/2021 | Fremine et al. |
| D910,655 S | 2/2021 | Matthewman et al. |
| D910,660 S | 2/2021 | Chaturvedi et al. |
| 10,916,220 B2 | 2/2021 | Ngo |
| 10,948,997 B1 | 3/2021 | Mctor-Faichney et al. |
| 10,987,573 B2 | 4/2021 | Nietfeld et al. |
| 11,086,476 B2 | 8/2021 | Inch et al. |
| 11,164,378 B1 | 11/2021 | Cowen et al. |
| 11,380,021 B2 | 7/2022 | Nakata |
| 11,520,707 B2 | 12/2022 | Satpathy et al. |
| 11,556,169 B2 | 1/2023 | Wallen et al. |
| 11,556,220 B1 | 1/2023 | Inch et al. |
| 11,676,351 B1 | 6/2023 | Yang et al. |
| 11,755,180 B1 | 9/2023 | Edelblut et al. |
| 11,836,205 B2 | 12/2023 | Inch et al. |
| 11,928,314 B2 | 3/2024 | Edelblut et al. |
| 2002/0073043 A1 | 6/2002 | Herman et al. |
| 2003/0179231 A1 | 9/2003 | Kamiwada et al. |
| 2005/0060661 A1 | 3/2005 | Kawahara et al. |
| 2008/0089587 A1 | 4/2008 | Kim et al. |
| 2008/0155118 A1 | 6/2008 | Glaser et al. |
| 2009/0103780 A1 | 4/2009 | Nishihara et al. |
| 2009/0279784 A1 | 11/2009 | Arcas et al. |
| 2010/0005424 A1 | 1/2010 | Sundaresan et al. |
| 2010/0050219 A1 | 2/2010 | Angiolillo et al. |
| 2010/0083112 A1 | 4/2010 | Dawson et al. |
| 2010/0169837 A1 | 7/2010 | Hyndman |
| 2010/0208033 A1 | 8/2010 | Edge et al. |
| 2010/0306716 A1 | 12/2010 | Perez |
| 2010/0332996 A1 | 12/2010 | Sarkaria |
| 2010/0332997 A1 | 12/2010 | Hamilton, II et al. |
| 2011/0055090 A1 | 3/2011 | Ross |
| 2011/0161843 A1 | 6/2011 | Bennett et al. |
| 2011/0164269 A1 | 7/2011 | Kamishiro |
| 2011/0267265 A1 | 11/2011 | Stinson |
| 2011/0276477 A1 | 11/2011 | Shuster |
| 2011/0302535 A1 | 12/2011 | Clerc et al. |
| 2012/0069168 A1 | 3/2012 | Huang et al. |
| 2012/0115122 A1 | 5/2012 | Bruce et al. |
| 2012/0143358 A1 | 6/2012 | Adams et al. |
| 2012/0206345 A1 | 8/2012 | Langridge |
| 2012/0249797 A1 | 10/2012 | Haddick et al. |
| 2012/0275686 A1 | 11/2012 | Wilson et al. |
| 2012/0293544 A1 | 11/2012 | Miyamoto et al. |
| 2013/0044128 A1 | 2/2013 | Liu et al. |
| 2013/0063345 A1 | 3/2013 | Maeda |
| 2013/0125066 A1 | 5/2013 | Klein et al. |
| 2013/0141428 A1 | 6/2013 | Gipson |
| 2013/0147793 A1 | 6/2013 | Jeon et al. |
| 2013/0178257 A1 | 7/2013 | Langseth |
| 2013/0179761 A1 | 7/2013 | Cho et al. |
| 2013/0265220 A1 | 10/2013 | Fleischmann et al. |
| 2014/0019609 A1 | 1/2014 | Williams et al. |
| 2014/0037218 A1 | 2/2014 | Zweig et al. |
| 2014/0125598 A1 | 5/2014 | Cheng et al. |
| 2014/0200084 A1 | 7/2014 | Butler et al. |
| 2014/0236996 A1 | 8/2014 | Masuko et al. |
| 2014/0316990 A1 | 10/2014 | Winston |
| 2015/0035746 A1 | 2/2015 | Cockburn et al. |
| 2015/0054742 A1 | 2/2015 | Imoto et al. |
| 2015/0062160 A1 | 3/2015 | Sakamoto et al. |
| 2015/0153833 A1 | 6/2015 | Pinault et al. |
| 2015/0160736 A1 | 6/2015 | Fujiwara |
| 2015/0169076 A1 | 6/2015 | Cohen et al. |
| 2015/0179147 A1 | 6/2015 | Rezaiifar et al. |
| 2015/0181679 A1 | 6/2015 | Liao et al. |
| 2015/0206321 A1 | 7/2015 | Scavezze et al. |
| 2015/0220150 A1 | 8/2015 | Plagemann et al. |
| 2015/0261659 A1 | 9/2015 | Bader et al. |
| 2015/0293666 A1 | 10/2015 | Lee et al. |
| 2015/0371441 A1 | 12/2015 | Shim |
| 2016/0044298 A1 | 2/2016 | Holz et al. |
| 2016/0062618 A1 | 3/2016 | Fagan et al. |
| 2016/0110052 A1 | 4/2016 | Kim et al. |
| 2016/0147308 A1 | 5/2016 | Gelman et al. |
| 2016/0378291 A1 | 12/2016 | Pokrzywka |
| 2017/0003750 A1 | 1/2017 | Li |
| 2017/0031503 A1 | 2/2017 | Rosenberg et al. |
| 2017/0039770 A1 | 2/2017 | Lanier et al. |
| 2017/0060230 A1 | 3/2017 | Faaborg et al. |
| 2017/0109936 A1 | 4/2017 | Powderly et al. |
| 2017/0139478 A1 | 5/2017 | Jeon et al. |
| 2017/0192513 A1 | 7/2017 | Karmon et al. |
| 2017/0236196 A1 | 8/2017 | Isaacson et al. |
| 2017/0236320 A1 | 8/2017 | Gribetz et al. |
| 2017/0237789 A1 | 8/2017 | Harner et al. |
| 2017/0262063 A1 | 9/2017 | Blénessy et al. |
| 2017/0278304 A1 | 9/2017 | Hildreth et al. |
| 2017/0287225 A1 | 10/2017 | Powderly et al. |
| 2017/0296363 A1 | 10/2017 | Yetkin et al. |
| 2017/0308608 A1 | 10/2017 | Freeman |
| 2017/0316606 A1 | 11/2017 | Khalid et al. |
| 2017/0336951 A1 | 11/2017 | Palmaro |
| 2017/0364198 A1 | 12/2017 | Yoganandan et al. |
| 2018/0024623 A1 | 1/2018 | Faaborg et al. |
| 2018/0040044 A1 | 2/2018 | Mattingly et al. |
| 2018/0053351 A1 | 2/2018 | Anderson |
| 2018/0059901 A1 | 3/2018 | Gullicksen |
| 2018/0059902 A1 | 3/2018 | Martin |
| 2018/0098059 A1 | 4/2018 | Valdivia et al. |
| 2018/0107278 A1 | 4/2018 | Goel et al. |
| 2018/0113599 A1 | 4/2018 | Yin |
| 2018/0143757 A1 | 5/2018 | Champion et al. |

(56) References Cited

U.S. PATENT DOCUMENTS

| | | |
|---|---|---|
| 2018/0144556 A1 | 5/2018 | Champion et al. |
| 2018/0207522 A1 | 7/2018 | Roman et al. |
| 2018/0307303 A1 | 10/2018 | Powderly et al. |
| 2018/0322674 A1 | 11/2018 | Du |
| 2018/0322701 A1 | 11/2018 | Pahud et al. |
| 2018/0335925 A1 | 11/2018 | Hsiao et al. |
| 2018/0342106 A1 | 11/2018 | Rosado |
| 2018/0349690 A1 | 12/2018 | Rhee et al. |
| 2018/0361258 A1 | 12/2018 | Malyuk |
| 2019/0005716 A1 | 1/2019 | Singh et al. |
| 2019/0026936 A1 | 1/2019 | Gorur Sheshagiri et al. |
| 2019/0035152 A1 | 1/2019 | Kazansky |
| 2019/0065027 A1 | 2/2019 | Hauenstein et al. |
| 2019/0088030 A1 | 3/2019 | Masterson et al. |
| 2019/0094981 A1 | 3/2019 | Bradski et al. |
| 2019/0107894 A1 | 4/2019 | Hebbalaguppe et al. |
| 2019/0121522 A1 | 4/2019 | Davis et al. |
| 2019/0139321 A1 | 5/2019 | Kocharlakota et al. |
| 2019/0197780 A1 | 6/2019 | Rao |
| 2019/0213792 A1 | 7/2019 | Jakubzak et al. |
| 2019/0258318 A1 | 8/2019 | Qin et al. |
| 2019/0278376 A1 | 9/2019 | Kutliroff et al. |
| 2019/0279424 A1 | 9/2019 | Clausen et al. |
| 2019/0286231 A1 | 9/2019 | Burns et al. |
| 2019/0287307 A1 | 9/2019 | Rogers et al. |
| 2019/0295101 A1 | 9/2019 | Porter et al. |
| 2019/0302895 A1 | 10/2019 | Jiang et al. |
| 2019/0304166 A1 | 10/2019 | Yu et al. |
| 2019/0306137 A1 | 10/2019 | Isaacson et al. |
| 2019/0310757 A1 | 10/2019 | Lee et al. |
| 2019/0340818 A1 | 11/2019 | Furtwangler |
| 2019/0347762 A1 | 11/2019 | Hwang et al. |
| 2019/0362562 A1 | 11/2019 | Benson |
| 2019/0377416 A1 | 12/2019 | Alexander |
| 2019/0385372 A1 | 12/2019 | Cartwright et al. |
| 2020/0020165 A1 | 1/2020 | Tran et al. |
| 2020/0050289 A1 | 2/2020 | Hardie-Bick et al. |
| 2020/0051527 A1 | 2/2020 | Ngo |
| 2020/0089390 A1 | 3/2020 | Bakhash |
| 2020/0097077 A1 | 3/2020 | Nguyen et al. |
| 2020/0097091 A1 | 3/2020 | Chou et al. |
| 2020/0111260 A1 | 4/2020 | Osborn et al. |
| 2020/0151965 A1 | 5/2020 | Forbes et al. |
| 2020/0193649 A1 | 6/2020 | Moon et al. |
| 2020/0218342 A1 | 7/2020 | Murali et al. |
| 2020/0225736 A1 | 7/2020 | Schwarz et al. |
| 2020/0225758 A1 | 7/2020 | Tang et al. |
| 2020/0226814 A1 | 7/2020 | Tang et al. |
| 2020/0241730 A1 | 7/2020 | DiVerdi et al. |
| 2020/0245017 A1 | 7/2020 | Ganschow et al. |
| 2020/0258278 A1 | 8/2020 | Mirhosseini et al. |
| 2020/0279044 A1 | 9/2020 | Lum et al. |
| 2020/0293178 A1 | 9/2020 | Kumar et al. |
| 2020/0294097 A1 | 9/2020 | Spivack et al. |
| 2020/0302680 A1 | 9/2020 | Yip et al. |
| 2020/0320794 A1 | 10/2020 | Huang et al. |
| 2020/0401687 A1 | 12/2020 | Mak |
| 2021/0005022 A1 | 1/2021 | Oser et al. |
| 2021/0011556 A1 | 1/2021 | Atlas et al. |
| 2021/0089639 A1 | 3/2021 | Remillet et al. |
| 2021/0090333 A1 | 3/2021 | Ravasz et al. |
| 2021/0103447 A1 | 4/2021 | Wei et al. |
| 2021/0124475 A1 | 4/2021 | Inch et al. |
| 2021/0168324 A1 | 6/2021 | Ngo |
| 2021/0201029 A1 | 7/2021 | Ju et al. |
| 2021/0252392 A1 | 8/2021 | Stevens |
| 2021/0271370 A1 | 9/2021 | Williams et al. |
| 2021/0343182 A1 | 11/2021 | Lu |
| 2021/0375065 A1 | 12/2021 | Cannefax et al. |
| 2021/0398095 A1 | 12/2021 | Mallett et al. |
| 2022/0036447 A1 | 2/2022 | Spivack et al. |
| 2022/0207830 A1 | 6/2022 | Allen et al. |
| 2022/0254114 A1 | 8/2022 | Frederick et al. |
| 2022/0292543 A1 | 9/2022 | Henderson |
| 2022/0308716 A1 | 9/2022 | Rice |
| 2022/0387873 A1 | 12/2022 | Hall et al. |
| 2022/0414487 A1 | 12/2022 | Si et al. |
| 2023/0092103 A1 | 3/2023 | Puyol et al. |
| 2023/0120052 A1 | 4/2023 | Wallen et al. |
| 2023/0152936 A1 | 5/2023 | Inch et al. |
| 2023/0171438 A1 | 6/2023 | Liu et al. |
| 2023/0245350 A1 | 8/2023 | Webber et al. |
| 2023/0325896 A1 | 10/2023 | Luker |
| 2023/0419617 A1 | 12/2023 | Krenn et al. |
| 2023/0419618 A1 | 12/2023 | Krenn et al. |
| 2024/0070215 A1 | 2/2024 | Inch et al. |
| 2024/0073489 A1 | 2/2024 | Hopmann |
| 2024/0112409 A1 | 4/2024 | Cross et al. |
| 2024/0160337 A1 | 5/2024 | Edelblut et al. |

FOREIGN PATENT DOCUMENTS

| | | |
|---|---|---|
| JP | 2001325616 A | 11/2001 |
| JP | 2009140294 A | 6/2009 |
| JP | 2014071498 A | 4/2014 |
| JP | 2018109835 A | 7/2018 |
| KR | 20170126362 A | 11/2017 |
| WO | 2022006661 A1 | 1/2022 |
| WO | 2022170222 A1 | 8/2022 |

OTHER PUBLICATIONS

Webxr, "WebXR Device API Explained", https://web.archive.org/web/20210823211837/https://immersive-web.github.io/webxr/explainer.html#objectdata-visualization, Aug. 23, 2021. (Year: 2021).*

International Search Report and Written Opinion for International Application No. PCT/US2023/025680, mailed Sep. 8, 2023, 11 pages.

David H., "Oculus Developer Hub can now Launch WebXR URLs on Your Quest," uploadvr.com, Dec. 4, 2021, 2 pages, Retrieved from the Internet: https://web.archive.org/web/20211204181804/https://www.uploadvr.com/oculus-developer-hub-web-urls-metrics/.

International Search Report and Written Opinion for International Application No. PCT/US2023/025685, mailed Oct. 5, 2023, 9 pages.

International Search Report and Written Opinion for International Application No. PCT/US2023/030469, mailed Nov. 20, 2023, 12 pages.

International Search Report and Written Opinion for International Application No. PCT/US2023/032524, mailed Nov. 16, 2023, 9 pages.

Oculus VR., "Oculus Developer Hub Update 1.8," Oculus, 5 pages, Jun. 22, 2021, Retrieved from the Internet: https://web.archive.org/web/20210622003501/https://developer.oculus.com/blog/oculus-developer-hub-update-18/.

International Search Report and Written Opinion for International Application No. PCT/US2023/018759, mailed Jun. 14, 2023, 9 pages.

Chen Y., et al., "Object Modeling by Registration of Multiple Range Images," Proceedings of the 1991 IEEE International Conference on Robotics and Automation, Apr. 1991, pp. 2724-2729, Retrieved from the internet: URL: https://graphics.stanford.edu/courses/cs348a-17-wi nter/Handouts/chen-medioni-align-rob91.pdf.

Foxman M., et al., "United We Stand: Platforms, Tools and Innovation with the Unity Game Engine," Social Media Society, Nov. 21, 2019, 10 pages.

Hincapie-Ramos J.D., et al., "GyroWand: IMU-Based Raycasting for Augmented Reality Head-Mounted Displays," Proceedings of the 3rd Association for Computing Machinery (ACM) Symposium on Spatial User Interaction, Los Angeles, CA, USA, Aug. 8-9, 2015, pp. 89-98.

International Preliminary Report on Patentability for International Application No. PCT/US2020/052976, mailed May 5, 2022, 9 pages.

International Search Report and Written Opinion for International Application No. PCT/US2020/052976, mailed Dec. 11, 2020, 10 Pages.

(56) References Cited

OTHER PUBLICATIONS

International Search Report and Written Opinion for International Application No. PCT/US2021/064674, mailed Apr. 19, 2022, 13 pages.

International Search Report and Written Opinion for International Application No. PCT/US2022/016110, mailed Apr. 29, 2022, 12 pages.

International Search Report and Written Opinion for International Application No. PCT/US2023/017413, mailed Jul. 4, 2023, 12 pages.

Katz N., et al., "Extending Web Browsers with a Unity 3D-Based Virtual Worlds Viewer," IEEE Computer Society, Sep./Oct. 2011, vol. 15 (5), pp. 15-21.

Mayer S., et aL, "The Effect of Offset Correction and Cursor on Mid-Air Pointing in Real and Virtual Environments," Proceedings of the 2018 CHI Conference on Human Factors in Computing Systems, Montreal, QC, Canada, Apr. 21-26, 2018, pp. 1-13.

Milborrow S., "Active Shape Models with Stasm," [Retrieved on Sep. 20, 2022], 3 pages, Retrieved from the internet: URL http://www.milbo.users.sonic.net/stasm/.

Milborrow S., et al., "Active Shape Models with SIFT Descriptors and Mars," Department of Electrical Engineering, 2014, 8 pages, Retrieved from the internet: URL: http://www.milbo.org/stasm-files/active-shape-models-with-sift-and-mars.pdf.

MRPT: "RANSAC C++ Examples," 2014, 6 pages, Retrieved from the internet: URL: https://www.mrpt.org/tutorials/programming/maths-and-geometry/ransac-c-examples/.

Office Action mailed Nov. 8, 2023 for European Patent Application No. 20789416.3, filed on Sep. 27, 2020, 4 pages.

Office Action mailed Mar. 14, 2024 for Chinese Application No. 202080057590.5, filed Sep. 27, 2020, 9 pages.

Office Action mailed Jul. 30, 2024 for Japanese Patent Application No. 2022-500566, filed on Sep. 27, 2020, 4 pages.

Olwal A., et al., "The Flexible Pointer: An Interaction Technique for Selection in Augmented and Virtual Reality," Proceedings of ACM Symposium on User Interface Software and Technology (UIST), Vancouver, BC, Nov. 2-5, 2003, pp. 81-82.

Orland K., "So What is the "Metaverse," Exactly?," ars Technica, Dec. 7, 2021 [Retrieved on Jun. 16, 2023], pp. 1-14, Retrieved from the Internet: https://web.archive.Org/web/20220407114023/https://arstechnica.com/gaming/2021/11/everyone-pitching-the-metaverse-has-a-different-idea-of-what-it-is/.

Qiao X., et al., "Web AR: A Promising Future for Mobile Augmented Reality—State of the Art. Challenges, and Insights," Proceedings of the IEEE, Apr. 2019, vol. 107 (4), pp. 651-666.

Renner P., et al., "Ray Casting", Central Facility Labs [Online], [Retrieved on Apr. 7, 2020], 2 pages, Retrieved from the Internet: URL:https://www.techfak.uni-bielefeld.de/~tpfeiffe/lehre/VirtualReality/interaction/ray_casting.html.

Schweigert R., et aL, "EyePointing: A Gaze-Based Selection Technique," Proceedings of Mensch and Computer, Hamburg, Germany, Sep. 8-11, 2019, pp. 719-723.

Srinivasa R.R., "Augmented Reality Adaptive Web Content," 13th IEEE Annual Consumer Communications & Networking Conference (CCNC), 2016, pp. 1-4.

Trademark Application Serial No. 73289805, filed Dec. 15, 1980, 1 page.

Trademark Application Serial No. 73560027, filed Sep. 25, 1985, 1 page.

Trademark Application Serial No. 74155000, filed Apr. 8, 1991, 1 page.

Trademark Application Serial No. 76036844, filed Apr. 28, 2000, 1 page.

Unity Gets Toolkit for Common AR/VR Interactions, Unity XR interaction Toolkit Preview [Online], Dec. 19, 2019 Retrieved on Apr. 7, 2020], 1 page, Retrieved from the Internet: URL: http://youtu.be/ZPhv4qmT9EQ.

Whitton M., et al., "Integrating Real and Virtual Objects in Virtual Environments," Aug. 24, 2007, Retrieved from http://web.archive.org/web/20070824035829/ http://www.cs.unc.edu/~whitton/ExtendedCV/Papers/2005-HCII-Whitton-MixedEnvs.pdf, on May 3, 2017, 10 pages.

Wikipedia: "Canny Edge Detector," [Retrieved on Sep. 20, 2022], 10 pages, Retrieved from the internet: URL: https://en.wi ki pedia.org/wiki/Canny_edge_detector.

Wikipedia: "Iterative Closest Point," [Retrieved on Sep. 20, 2022], 3 pages, Retrieved from the internet: URL: https://en.wikipedia.org/wiki/Iterative_closest_point.

Bhattacharyya A., "Reimagining the Internet: This Browser Allows Users to View Websites in 3D," Hindustan Times, Toronto, Jul. 11, 2017, pp. 1-8, Retrieved from Internet URL: https://www.hindustantimes.com/world-news/this-browser-allows-users-to-view-websites-in-3d/ story-ts6MPeGeuEAGdR8b7cPleL.html.

International Preliminary Report on Patentability for International Application No. PCT/US2023/017413, mailed Oct. 17, 2024, 10 pages.

International Preliminary Report on Patentability for International Application No. PCT/US2023/018759, mailed Oct. 31, 2024, 8 pages.

\* cited by examiner

URL ACCESS TO ASSETS WITHIN AN ARTIFICIAL REALITY UNIVERSE ON BOTH 2D AND ARTIFICIAL REALITY INTERFACES

TECHNICAL FIELD

The present disclosure is directed to uniform resource locator (URL) access to assets within an artificial reality (XR) universe on both two-dimensional (2D) and XR interfaces.

BACKGROUND

Users interacting with artificial reality (XR) devices can view content in an artificial reality environment that includes real-world objects and/or two-dimensional (2D) and/or three-dimensional (3D) virtual objects. For example, the artificial reality environment can be a virtual environment depicted by a virtual reality (VR) device showing a set of virtual objects. As another example, the artificial reality environment can a mixed reality environment with real-world objects and virtual objects supplemented over the real-world objects. A user can view the objects in the artificial reality environment and modify content in the artificial reality environment.

Applications can exist that can operate on both XR interfaces and two-dimensional (2D) interfaces. A 2D interface can be a flat surface that can display 2D content, such as objects, graphics, text, etc. For example, a 2D interface can be a web browser or other application on a computer, mobile device, television, or other display device. On the 2D interface, content can be rendered differently than on an XR interface due to the limitations of a 2D interface as compared to a fully immersive XR experience.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
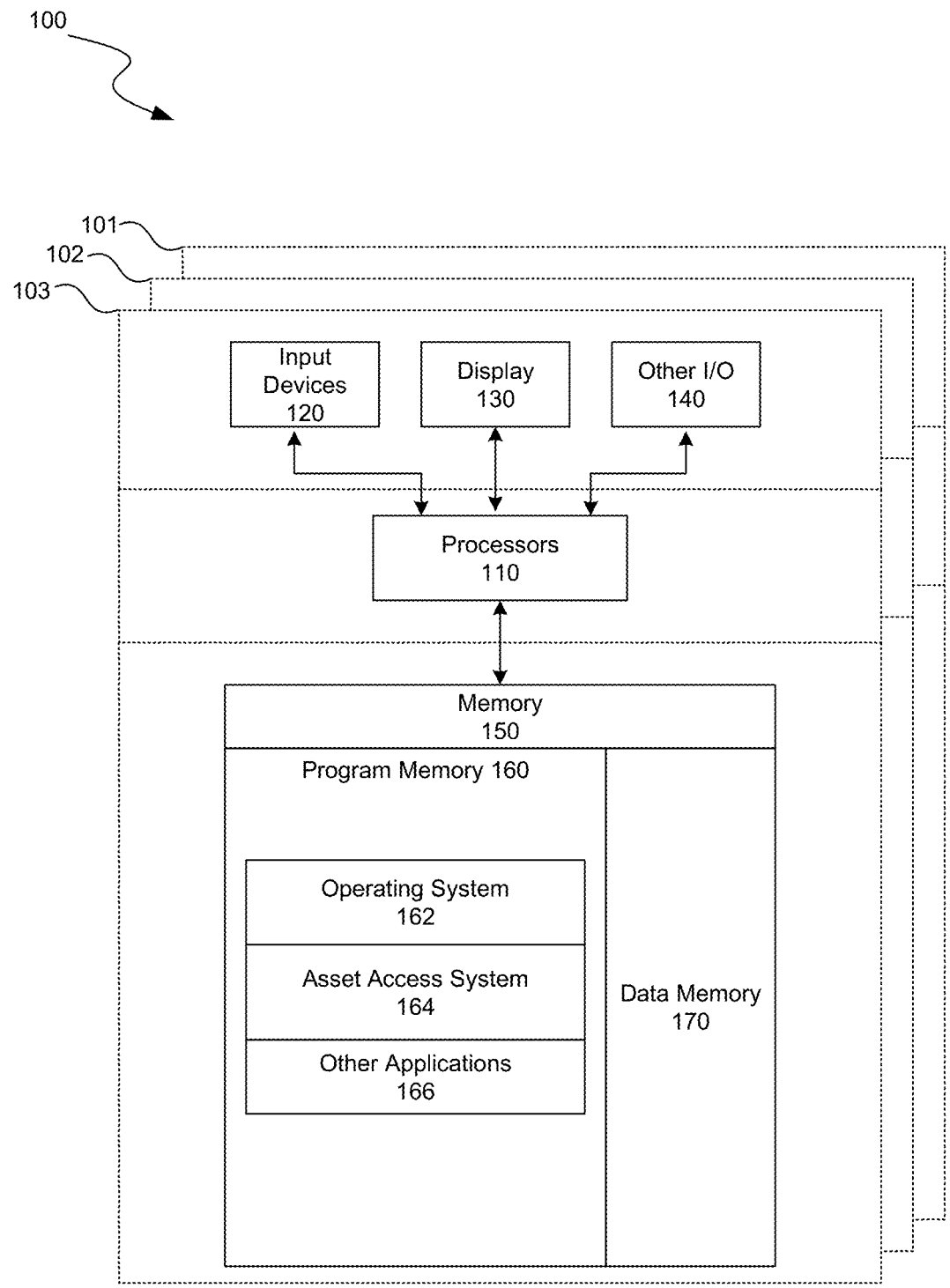
FIG. 1 is a block diagram illustrating an overview of devices on which some implementations of the present technology can operate.

Aspects of the present disclosure are directed to uniform resource locator (URL) access to assets within an artificial reality (XR) universe from both two-dimensional (2D) interfaces (e.g., web browsers on a computer, applications on a mobile device, etc.) and XR interfaces (e.g., head mounted XR displays). As used herein, an "XR universe" can be a metaverse or a universe within the metaverse made up of one or more virtual spaces referred to as worlds. As used herein, a "metaverse" can be a superset of all virtual spaces where users (e.g., represented by avatars) can interact with a virtual environment, virtual objects, and each other. The metaverse can include virtual universes, each hosted by one organization or multiple different organizations, and can be the top level of a virtual space conceptual hierarchy. As used herein, an "XR universe" within the metaverse can be a set of virtual spaces in a metaverse having distinct virtual world settings, such as different objectives, rules, environments, art styles, etc., backed up by the same application service. Although it is contemplated that one host server can host multiple XR universes, it is also contemplated that multiple host servers can host a single XR universe.

Implementations relate to a uniform HTTP URL schema that can represent an asset within the XR universe, such as a destination, a timely event (e.g., a meeting), or an object (e.g., a player, vehicle, etc.), which can possibly move across worlds within the XR universe. The URL can be semantically meaningful and reflect the hierarchical structure of the location of the asset within the XR universe. The URL can be shareable and addressable from both inside and outside the XR universe, including from both 2D and XR interfaces. Implementations have different processing flows for the URL depending on whether the URL is activated from an XR interface or from a 2D interface (e.g., a web browser or application on a mobile device, desktop, or other flat-screen based device). For example, accessing the URL from a 2D interface can lead the user to a landing page in which the world title, snapshot, and description are displayed. Based on factors such as the user profile and a type of the world, the user can choose to continue and visit the world from the 2D interface, or to instead visit the world from an XR interface (e.g., by having the destination preloaded for automatic travel when she dons her XR device).

For example, while using a 2D interface such as a mobile device or laptop, a user can click a URL (or virtual object linked to the URL) while on a webpage for a virtual lobby of a virtual office. The URL can be associated with a virtual meeting in a virtual conference room. The web browser can display a landing page showing, for example, the world title (e.g., "Conference Room"), a description of the event (e.g., "Brainstorming Session for New Products"), and a graphical preview of the virtual conference room (possibly including avatars or a list of participants already in the meeting). In some implementations, the web browser can further display an option to continue to the virtual meeting on the web browser, or to switch to an XR interface to virtually attend the meeting. However, it is contemplated that such an option need not be displayed in some implementations. For example, the user can simply click on the graphical preview of the virtual conference room to enter the meeting via the web browser. In another example, the user can simply don her XR device (e.g., a head-mounted display), which can cause the user to enter the XR environment for the virtual meeting via her XR device.

When accessing the URL from an XR interface using an XR device, the user can see prefetched information (e.g., metadata) regarding an asset, such as a destination world within an XR universe, that is automatically presented to the user in a sensible manner, such as in a rendering of a travel portal. Activation of the portal activates the URL to: download an application corresponding to the destination world, if necessary; map the destination world to an intent (i.e., a dynamic component of the destination world, such as a specific time or set of users) designated in the URL; obtain user entitlements with respect to the destination world; and render the destination world.

For example, a user can select a URL (or virtual object linked to the URL) within a virtual world on an XR device, e.g., from within a golfing world. The URL can be associated with another world inside or outside of same XR universe, e.g., a bowling world. The XR device can display prefetched information (e.g., metadata) regarding the bowling world. For example, the XR device can display details regarding the bowling world, such as those described with respect to the landing page above. In another example, the XR device can show a virtual doorway in the golfing world representing travel to the bowling world. When the user approaches the virtual doorway, the XR device can preload information about the bowling world for display, such as a snapshot (e.g., a rendering or description) of the bowling world. The user can select the virtual doorway, which can cause the XR device (or another device in communication with the XR device) to download an application associated with the bowling world, if not already downloaded. In another example, selection of the doorway can cause the XR device to stream the application associated with the bowling world. The XR device can map the bowling world to any intents (i.e., dynamic components), such as other players within the bowling world, matches already occurring in the bowling world, etc., at that particular time. The XR device can further determine any virtual objects present in the golfing world that can be brought into the bowling world (i.e., user entitlements), such as virtual outfits and other objects. The XR device can then render the bowling world for the user based on the intent and entitlements.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Existing uniform resource identifiers (URIs) used to access virtual worlds or experiences have a number of drawbacks. For example, existing URIs can be specific to a single virtual world or universe, and thus cannot be used to access other virtual worlds within an XR universe or other XR universes. In another example, existing URIs can be specific to a single platform. For example, a URI associated with a virtual experience on a web browser can be different than a URI associated with the same experience on a mobile application or an XR device. Although some existing URIs use HTTP addressable URLs, such URLs are not semantically meaningful or descriptive of the destination of the URL (e.g., "https://www.example.com/vr/?id=348687430928758").

The implementations described herein address these problems and others by providing a uniform URL schema that allows users to access virtual experiences across a number of platforms, and even to switch between platforms. For example, a single common URL can be used across both 2D and XR interfaces (e.g., web browsers, mobile applications, XR devices, etc.), and can be addressable using standard HTTP protocols. Further, the URL can be semantically meaningful and reflect the hierarchical structure of a destination location, making the URL friendly to users, search engines, and world discovery services. Thus, the implementations described herein overcome the existing problems with locating and accessing virtual experiences described above, and provide a technological solution rooted in virtual asset addressability over a computer network for different devices and platforms.

Several implementations are discussed below in more detail in reference to the figures. FIG. 1 is a block diagram illustrating an overview of devices on which some implementations of the disclosed technology can operate. The devices can comprise hardware components of a computing system 100 that can provide access to an asset within an artificial reality (XR) universe using a single URL on both a 2D interface and an XR interface. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (H P Us), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, asset access system 164, and other application programs 166. Memory 150 can also include data memory 170 that can include, e.g., application data, asset data, entitlement data, dynamic content data, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
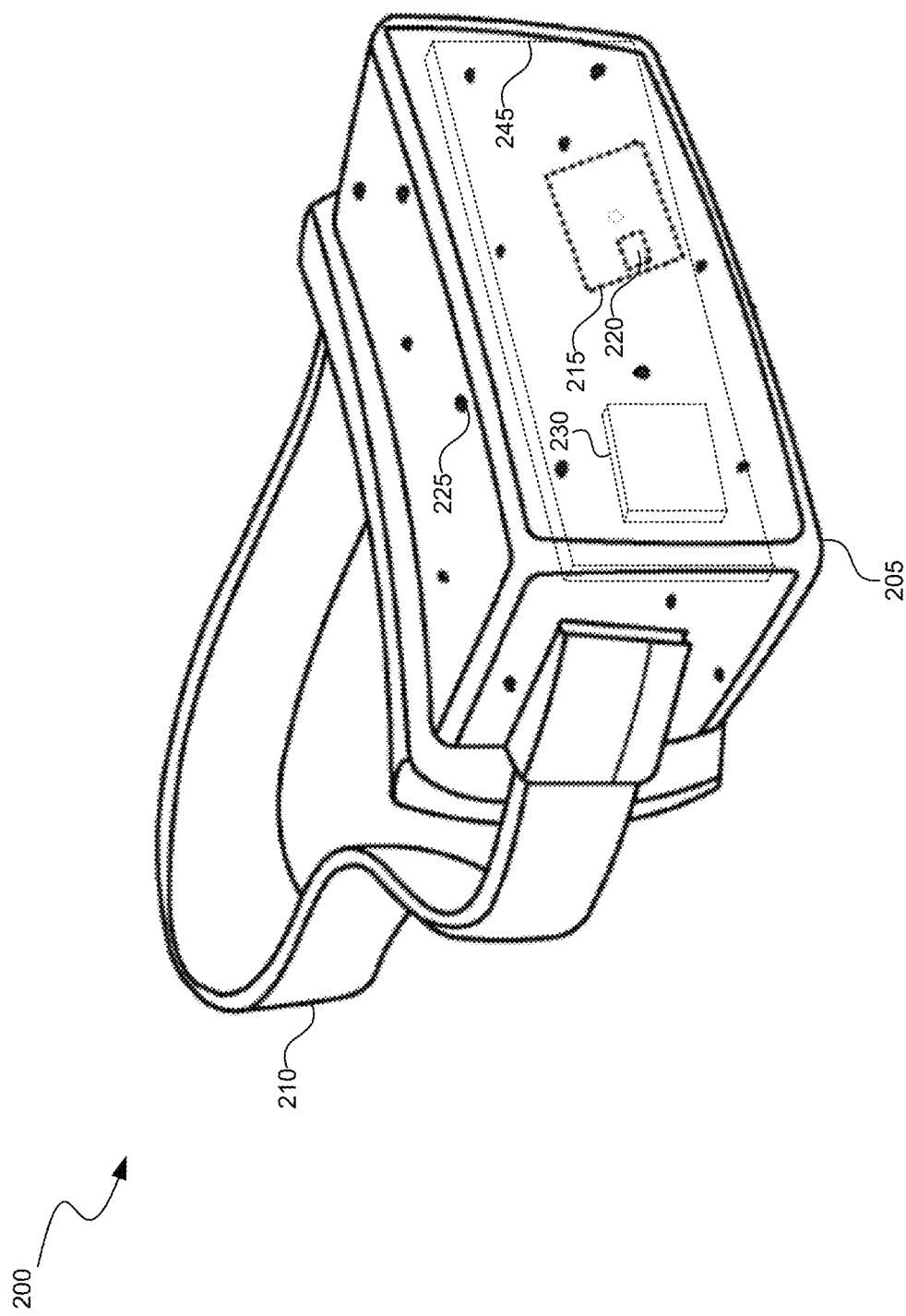
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
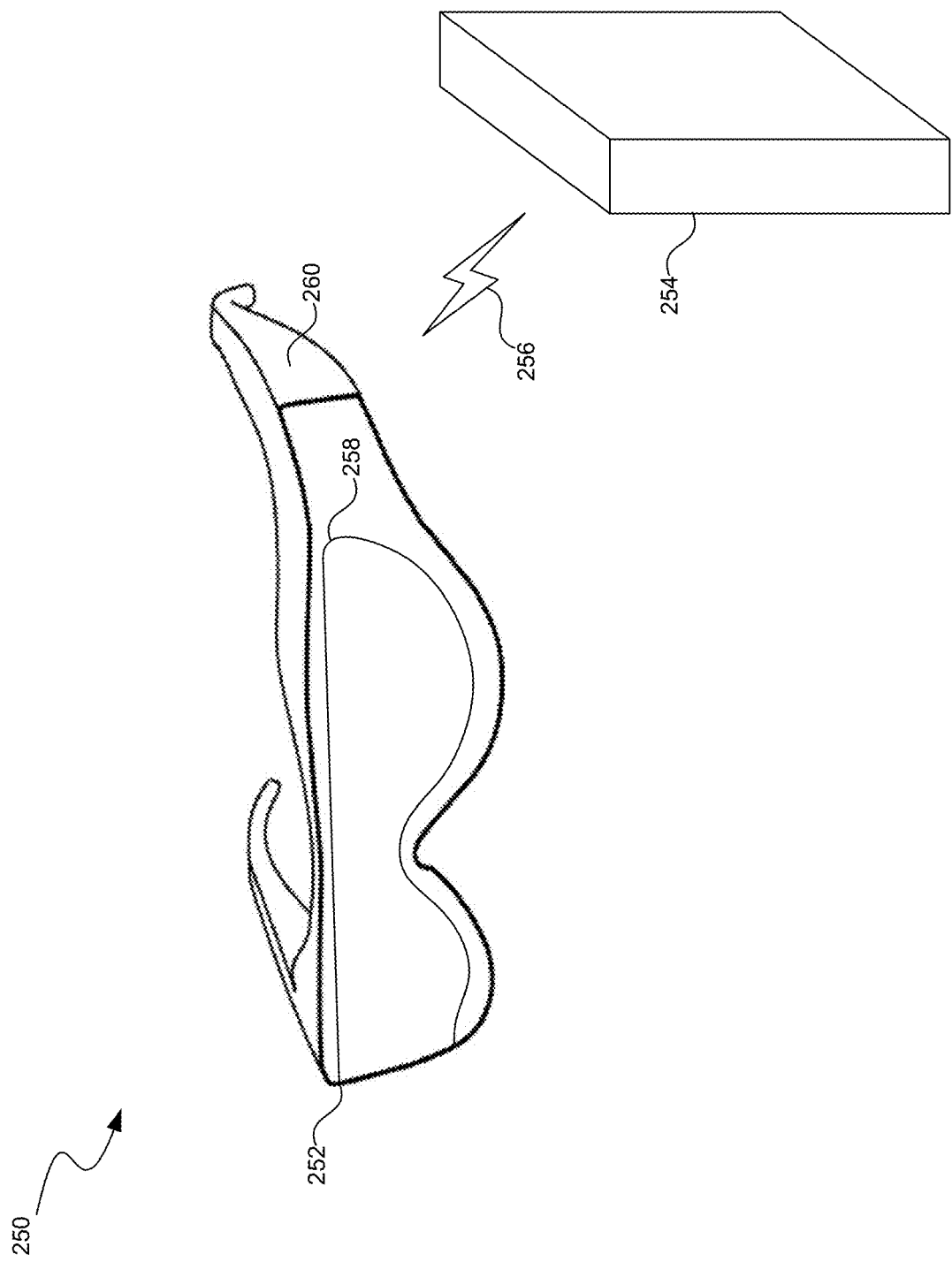
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
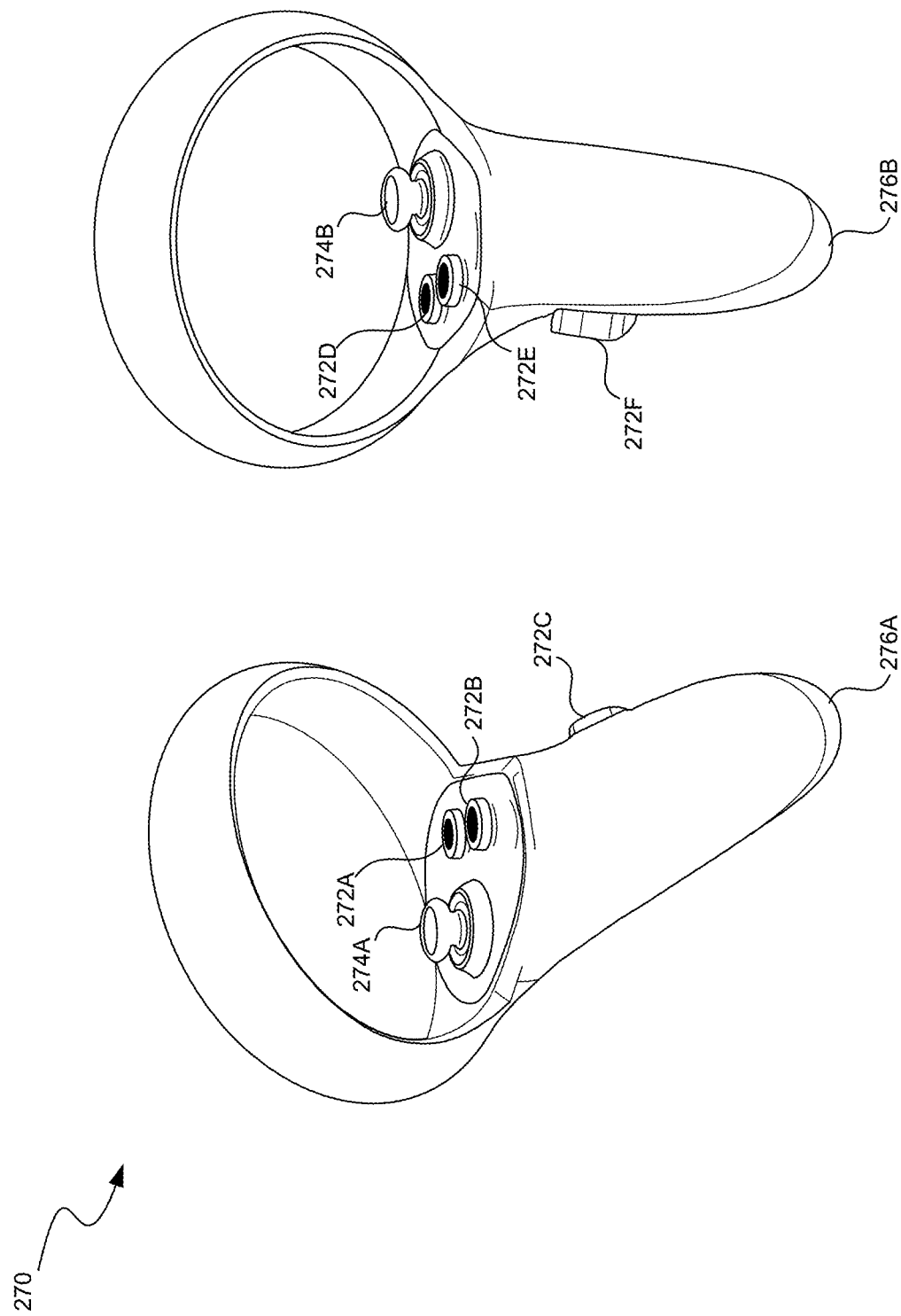
FIG. 2C is a wire diagram illustrating controllers which, in some implementations, a user can hold in one or both hands to interact with an artificial reality environment.

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
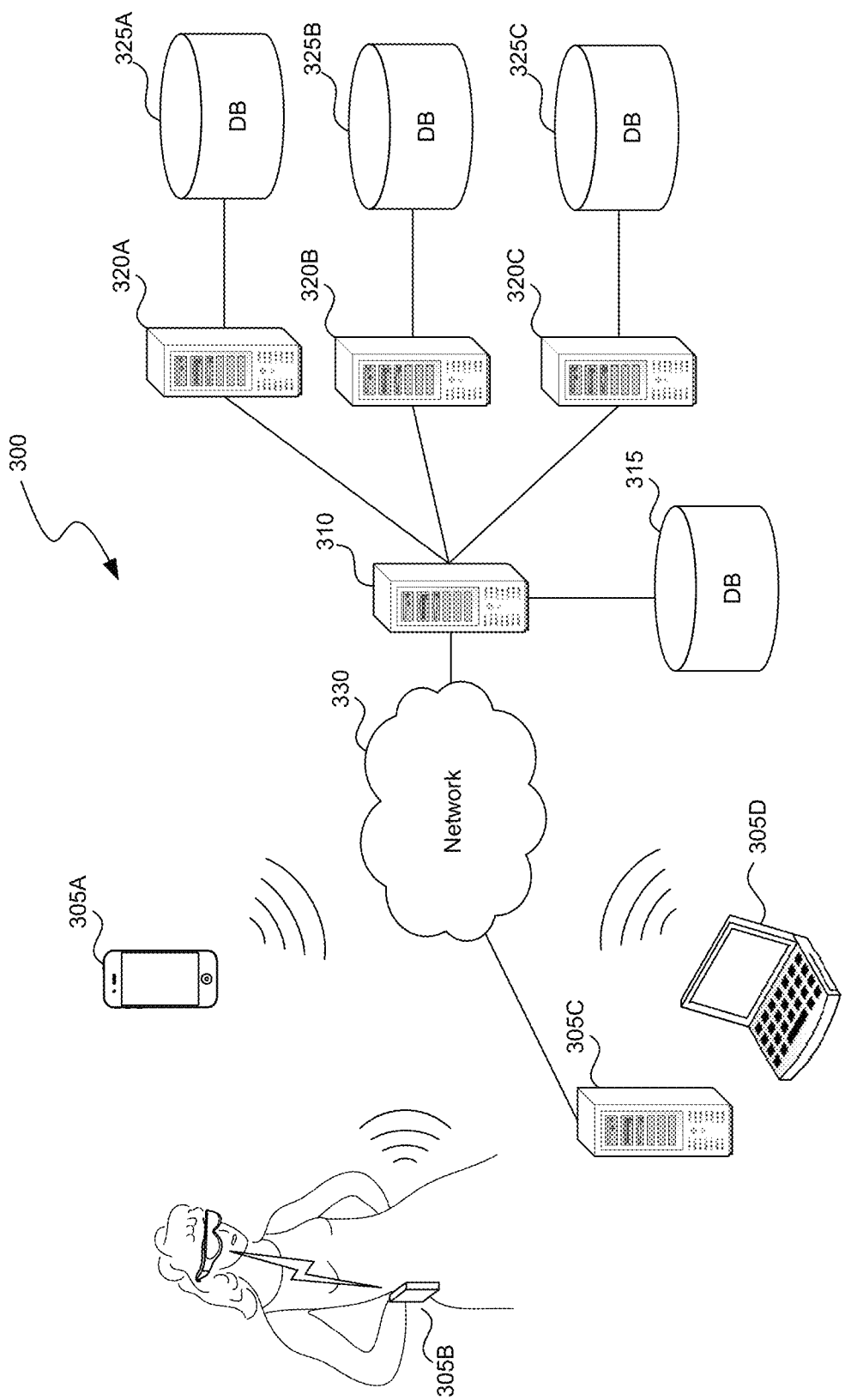
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
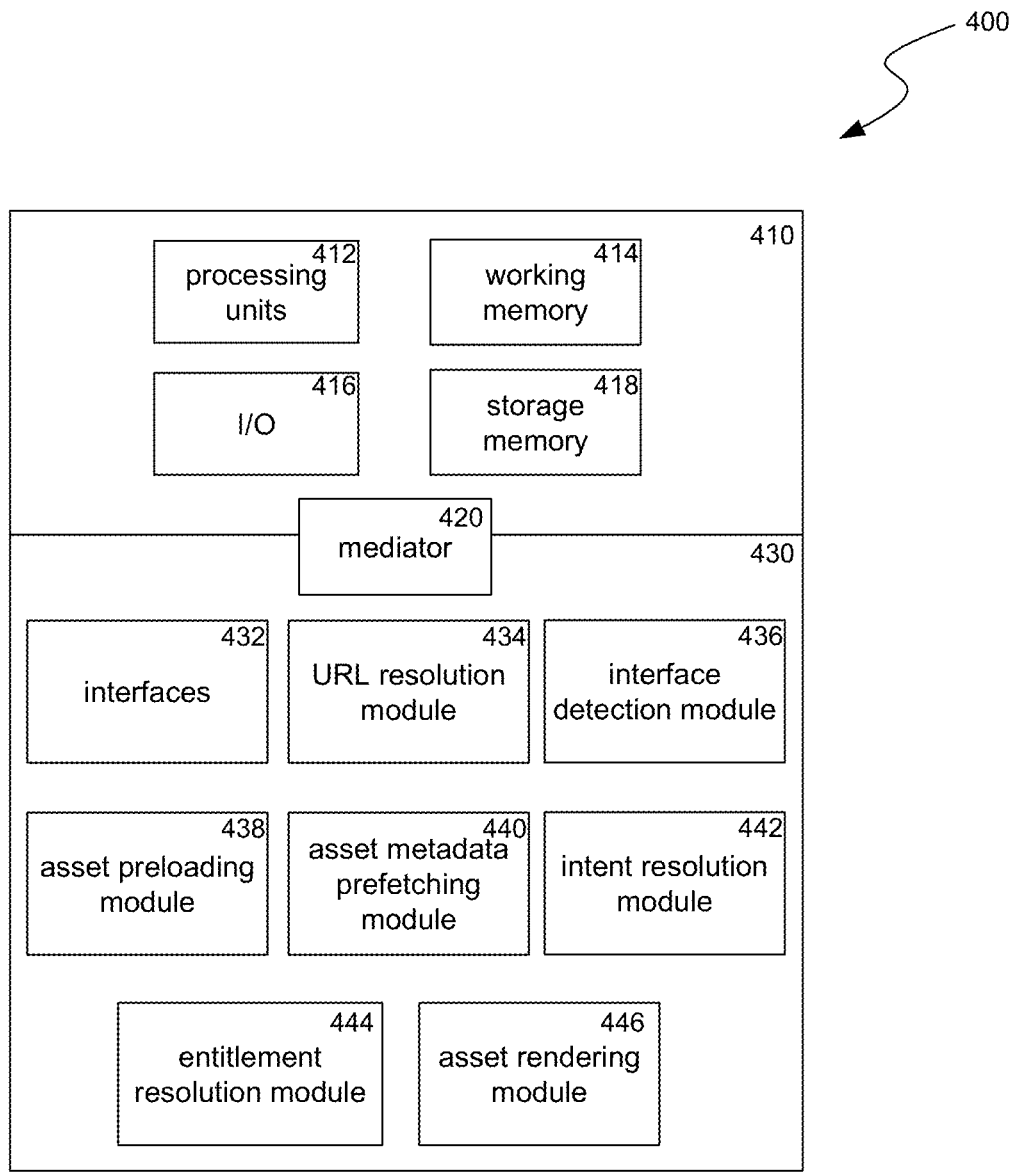
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for providing access to an asset within an XR universe using a single URL for both a 2D interface and an XR interface. Specialized components 430 can include URL resolution module 434, interface detection module 436, asset preloading module 438, asset metadata prefetching module 440, intent resolution module 442, entitlement resolution module 444, asset rendering module 446, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

URL resolution module 434 can receive a request to access an asset via a URL. The URL can be a standard HTTP URL that is semantically meaningful and reflect the hierarchical structure of the location of the asset within the XR universe. The URL can include a scheme (e.g., http or https), domain name (e.g., www.example.com), hierarchical path to the asset (e.g., XR universe, virtual world within the XR universe, room within the virtual world, etc.), and, in some implementations, an intent represented by a unique ID (e.g., "583045"), the intent specifying a dynamic, variable, and/or changeable component of the asset. URL resolution module 434 can parse the URL to extract its components and identify the asset associated with the request, the host server to which to direct the request, etc. Further details regarding URL resolution are described herein with respect to block 502 of FIG. 5.

Interface detection module 436 can determine whether a request was received from a 2D interface or an XR interface. In some implementations, the request can be accompanied by metadata identifying the interface from which the request was transmitted, e.g., a web browser, an application on a mobile device, an XR virtual world, etc. Further details regarding interface detection are described herein with respect to block 504 of FIG. 5.

Asset preloading module 438 can facilitate downloading and/or preloading of scripts and data bundles associated with an asset existing in a 2D and/or XR environment. For example, asset preloading module 438 can facilitate preloading the data regarding the asset on an XR device (including the XR interface) or a 2D device (including the 2D interface) to allow for automatic loading of the asset on the respective interface upon receiving a request to access the asset. For example, if a representation of a user approaches a virtual doorway representing travel to another virtual world on an XR device, asset preloading module 438 can automatically display the preloaded data to the user, without the user having to wait for downloading, processing, and rendering of the asset. Further details regarding asset preloading are described herein with respect to FIG. 5.

Asset metadata prefetching module 440 can prefetch information regarding the asset when the request to access the asset is received from the 2D or XR interface. The prefetched metadata can be, for example, an asset name, an asset snapshot, a description of the asset, an invitation message, information about who shared the URL to access the asset, etc. The prefetched metadata can also include information that is not displayed to the user, such as an access token, an application ID, a snapshot ID, etc. Further details regarding fetching asset metadata are described herein with respect to blocks 506 and 514 of FIG. 5.

Intent resolution module 442 can resolve any intents with respect to the asset specified by the URL, i.e., any dynamic component(s) associated with the asset. The dynamic components can be any aspects of the asset that can be variable, such as a time of day, a specific set of users, a specific event, or any other changeable feature of a virtual world (e.g., weather, time of the year, look of a user's avatar, etc.). Further details regarding intent resolution are described herein with respect to FIG. 5.

Entitlement resolution module 444 can resolve any entitlements with respect to the asset when the asset is a virtual world. The user entitlements can be parameters by which one or more virtual objects can move between virtual 2D and/or XR worlds when a user is moving from one virtual world to another. Entitlement resolution module 444 can determine whether the virtual objects are legitimate; whether the virtual objects are available in the virtual world and in what instances; and/or features, characteristics, and abilities of the virtual objects within the virtual world; and use this information to authenticate and/or modify the virtual objects for the new virtual world. Further details regarding entitlement resolution are described herein with respect to FIG. 5.

Asset rendering module 446 can facilitate rendering of the asset on the 2D or XR interface, e.g., by causing the asset to be rendered on the 2D interface or the XR interface, by providing any data that assists in rendering the asset, etc. When the asset is a virtual world, asset rendering module 446 can facilitate rendering of the asset with any virtual objects brought from a previous virtual world based on the user entitlements resolved by entitlement resolution module 444. In some implementations, asset rendering module 446 can facilitate rendering the asset according to any intents specified by the URL, i.e., with any dynamic components of the asset. Further details regarding facilitation of asset rendering are described herein with respect to blocks 512 and 520 of FIG. 5.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
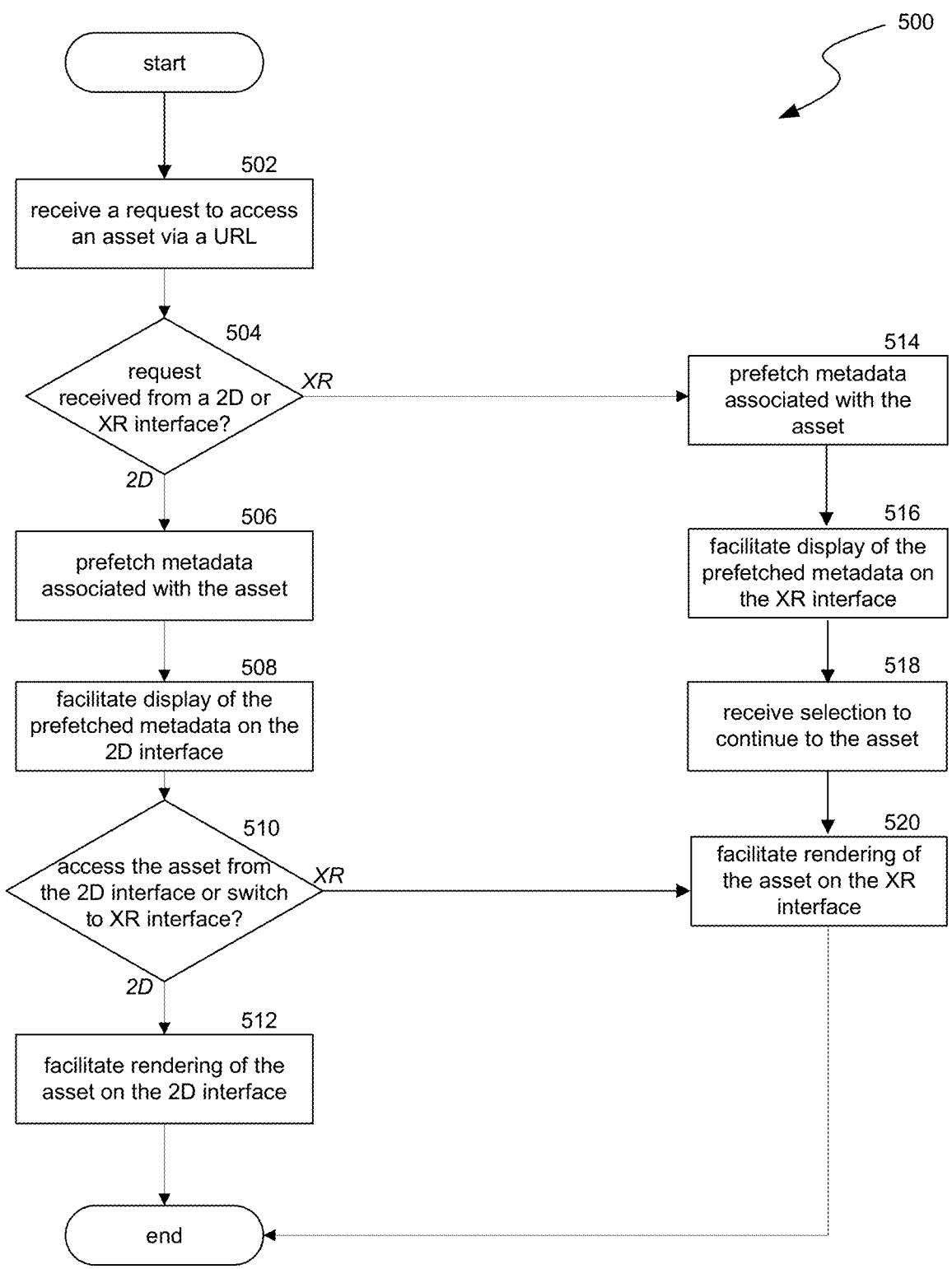
FIG. 5 is a flow diagram illustrating a process used in some implementations of the present technology for providing access to an asset within an artificial reality universe using a single URL on both a 2D interface and an artificial reality interface.

FIG. 5 is a flow diagram illustrating a process 500 used in some implementations for providing access to an asset within an XR universe using a single URL when accessed from either a 2D interface or an XR interface. In some implementations, process 500 can be performed as a response to a user request to access an asset via a URL. Process 500 can be performed by, for example, asset access system 164 of FIG. 1, either on a server (e.g., a host server described herein) or combination of servers over a network, or locally on a user system or device, i.e., an XR device (e.g., a head-mounted display) or 2D device, such as a computer or other display or processing device. In some implementations, some steps of process 500 can be performed on a server, while other steps of process 500 can be performed locally on a user device. Although illustrated as having only one iteration, it is contemplated that process 500 can be performed multiple times, repeatedly, consecutively, concurrently, in parallel, etc., as requests to access an asset are received from or at one or more user devices. For example, process 500 can perform steps 502, 504, 506, 508, 510, and 512 as a first process; preceded by or followed by steps 502, 504, 514, 516, 518, and 520 as a second process, and/or preceded or followed by steps 502, 504, 506, 508, 510, and 520 as a third process.

At block 502, process 500 can receive a request to access an asset via a URL. The asset can be any virtual item that can exist in an XR universe, including a destination (e.g., a virtual world within the XR universe, a virtual location within a virtual world, etc.), a timely event (e.g., a virtual meeting, concert, party, etc.), or an object (e.g., a virtual representation of a user, animal, vehicle, tree, etc.). Process 500 can parse the URL to extract its components and identify the asset associated with the request, the universe server to which to direct the request, the XR universe within which the asset exists, etc.

The URL, or uniform resource locator, can represent an address of the asset where the asset can be located or retrieved. The URL can include a scheme indicating the set protocol that a browser must use to retrieve the asset, an authority, and a path to the asset. In some implementations, the URL can further include an intent represented by a unique ID, the intent specifying a dynamic component of the asset. The dynamic components can be any aspects of the asset that can be variable, such as a time of day, a specific set of users, a specific event, or any other changeable feature of a virtual world (e.g., weather, time of the year, look of a user's avatar, etc.). Further details regarding the URL are described herein with respect to FIG. 6.

At block 504, in response to the request being received, process 500 can determine whether the request was received from a 2D interface or an XR interface. In some implementations, process 500 can parse metadata received with the request to determine whether it was sent from a 2D device (e.g., a computer, a cell phone, etc.) via a web browser or an XR device within an XR universe. For example, the URL can have a different header based on whether it was received from a 2D interface or an XR interface, and in some implementations, can have an adjacent payload identifying the protocol over which to communicate with the requesting device.

If process 500 determines that the request was received from a 2D interface, process 500 can continue to block 506. At block 506, in response to the request being received from a 2D interface, process 500 can prefetch metadata associated with the asset. The prefetched metadata can be, for example, an asset name, an asset snapshot, a description of the asset, an invitation message, information about who shared the URL to access the asset, etc. Process 500 can also prefetch information that is not displayed to the user, such as an access token, an application ID, a snapshot ID, etc. In some implementations, process 500 can prefetch the metadata from a universe server via a host server designated by the URL, as described further herein with respect to FIGS. 8 and 9.

At block 508, process 500 can facilitate presentation of at least some of the prefetched metadata on the 2D interface. Process 500 can display the prefetched metadata in a meaningful way, such as by displaying it in association with a virtual rendering associated with asset access, such as a virtual gateway, portal, doorway, destination snapshot, etc. In some implementations, process 500 can display the prefetched metadata when a representation of the user on the 2D interface approaches (e.g., comes within a threshold distance) of the virtual rendering associated with asset access, such as when the representation of the user approaches a virtual snapshot of the destination world.

In some implementations, process 500 can facilitate display of the prefetched metadata as a landing page. The landing page can include, for example, the asset (e.g., a world type), the snapshot of the asset (e.g., a preview of the asset as rendered on the 2D interface), and a description of the asset. In some implementations, the landing page can further include an option to continue to the asset on the 2D interface or to switch to an XR interface, as described below with respect to block 510.

In some implementations, upon display of the prefetched data, process 500 can cause the 2D device (including the 2D interface) to download and preload any scripts and data bundles associated with the asset that are needed to initially render the asset upon a selection to continue to the asset on the 2D interface. Similarly, process 500 can cause an XR device (including the XR interface) to download and preload any scripts and data bundles associated with the asset that are needed to initially render the asset upon a selection to continue to the asset on the XR interface. In some implementations, process 500 can establish such pre-communication with the XR device prior to it being donned by a user by retrieving a profile associated with the user including data identifying the XR device. Process 500 can use such identifying data to locate the XR device associated with the user and establish communication with the XR device.

At block 510, process 500 can determine whether the asset will be accessed from the 2D interface or whether to switch to an XR interface. The determination of whether the asset will be accessed from the 2D interface or the XR interface can be received as either explicit or implicit input. For example, process 500 can receive an explicit selection from the user on the landing page indicating that the user wants to continue on the 2D interface or to switch to an XR interface, either by selecting a button, or by selecting the snapshot of the asset or other rendering representing travel to the asset (e.g., a virtual doorway). In some implementations, process 500 can receive an implicit indication from the user indicating that the user wants to continue on the 2D interface or to switch to the XR interface. For example, process 500 can detect donning or activation of an XR device and determine that the asset should be accessed on the XR interface. Conversely, process 500 can determine that the asset should be accessed on the 2D interface if process 500 does not detect activation or donning of an XR device within a specified time period. In some implementations, it is contemplated that process 500 can determine that the asset should not be accessed, e.g., if the user does not select to continue on the 2D or XR interface, or if process 500 does not detect activation or donning of the XR device.

If process 500 determines that the asset is a virtual world that will be accessed on the 2D interface, process 500 can obtain user entitlements with respect to one or more virtual objects to be brought into the virtual world in some implementations. The user entitlements can be parameters by which one or more virtual objects can move between virtual worlds when a user is moving from one virtual world to another on the 2D interface. For example, when a user desires to enter a new virtual world with virtual objects available in another virtual world (e.g., a user requests access to a new virtual world with existing virtual objects), process 500 can determine whether the virtual objects are legitimate; whether the virtual objects are available in the new virtual world and in what instances; and/or features, characteristics, and abilities of the virtual objects within the new virtual world; and use this information to authenticate and/or modify the virtual objects for the new virtual world on the 2D interface.

For example, a user can have particular virtual objects within a "CatLand" virtual world, such as a virtual cat and a particular outfit for his avatar. Within "CatLand", the user can activate a URL requesting travel from "CatLand" to "Dog Land." Process 500 can determine whether the outfit and cat are authentic, can determine whether the outfit and cat are available in "DogLand," and if they are available, determine any modifications that need to be made to them when entering "DogLand." For example, process 500 can determine that the user only has permission to use that particular outfit within "CatLand," and instead select an outfit available to the user within "DogLand." In another example, process 500 can determine that the virtual cat is only available in "CatLand," and modify the virtual cat to instead be a dog within "DogLand."

Process 500 can continue to block 512. At block 512, process 500 can facilitate rendering of the asset on the 2D interface. Process 500 can facilitate rendering of the asset on the 2D interface by instructing the 2D interface to render the asset, and/or by providing any data used by the 2D interface to render the asset, such as the metadata associated with the asset, the user entitlements, confirmation or acknowledgment responses, etc., as described further herein with respect to FIG. 8.

In some implementations, process 500 can facilitate preloading of the asset for the 2D interface when process 500 receives the request for the asset, as described above. Thus, process 500 can facilitate automatic and immediate rendering of the asset in the 2D environment upon receiving an implicit or explicit selection to continue to the asset on the 2D interface. In some implementations, the 2D interface, such as a web browser or application on a mobile device, can render the asset using 3D modeling to emulate the view of the asset on the XR interface. In some implementations, when the URL specifies an intent (i.e., a dynamic, variable, and/or changeable component of the asset), process 500 can map the intent to the asset prior to rendering the asset. For example, if the intent specifies a specific group of users invited to an event, process 500 can render the event including avatars of the users invited or those attending the event.

In implementations in which process 500 obtains user entitlements, process 500 can facilitate rendering of the asset with the one or more virtual objects, based on the user entitlements, on the 2D interface. In the above example, process 500 can facilitate rendering of the user's avatar in the virtual world "DogLand" with an outfit available in "DogLand" and with an accompanying virtual dog on the 2D interface, such as on a computer's web browser or a mobile device. In some implementations, process 500 can facilitate rendering the asset according to the mapped intent to reflect the dynamic, variable, and/or changeable components of the asset.

Although described herein that process 500 can facilitate display of the prefetched metadata on the 2D interface, it is contemplated that in some implementations, process 500 can receive the request at block 502 via a one click user interaction (e.g., the clicking of a mouse button or other input button on the 2D interface), and process 500 can render the asset on the 2D interface automatically at block 512 in response to the one click user interaction. For example, at block 502, process 500 can receive a request to access the asset via a URL that includes a parameter to indicate automatic redirection to the asset. The user can choose (or the URL can indicate) that the user wishes to bypass display of the prefetched metadata (e.g., the landing page) associated with the asset, and process 500 can facilitate display of the asset without further implicit or explicit instruction from the user.

If process 500 determines that the asset should be accessed by an XR interface instead of the 2D interface, process 500 can continue to block 520. At block 520, process 500 can facilitate rendering of the asset on the XR interface. Process 500 can facilitate rendering of the asset on the XR interface by instructing the XR interface to render the asset, and/or by providing any data used by the XR interface to render the asset, such as the metadata associated with the asset, the user entitlements, remote launch data, confirmation or acknowledgment responses, etc., as described further herein with respect to FIG. 9.

In some implementations, process 500 can facilitate preloading of the asset for the XR interface prior to switching to the XR interface, as described above. Thus, process 500 can automatically and immediately render the asset in the XR environment upon detecting activation or donning of an XR device associated with the user traveling from a 2D interface, or upon explicit instruction from the user to do so.

If, at block 504, process 500 determines that the request was received from an XR interface, process 500 can continue to block 514. At block 514, in response to the request being received from the XR interface, process 500 can prefetch metadata associated with the asset. The prefetched metadata can be, for example, an asset name, an asset snapshot, a description of the asset, an invitation message, information about who shared the URL to access the asset, etc. Process 500 can also prefetch metadata that is not displayed to the user, such as an access token, an application ID, a snapshot ID, etc. In some implementations, process 500 can prefetch the metadata from a universe server via a host server designated by the URL, as described further herein with respect to FIG. 7A.

At block 514, process 500 can facilitate presentation of at least some of the prefetched metadata. Process 500 can facilitate display the prefetched metadata in a meaningful way, such as in association with a virtual rendering associated with asset access, such as a virtual gateway, portal, doorway, etc. In some implementations, process 500 can facilitate display of the prefetched metadata when a representation of the user on the XR interface approaches (e.g., comes within a threshold distance) of the virtual rendering associated with asset access, such as when the representation of the user approaches the virtual portal.

In some implementations, process 500 can cause the XR device (including the XR interface) to download and preload any scripts and data bundles associated with the asset that are needed to initially render the asset upon a selection to continue to the asset on the XR interface. In some implementations, process 500 can cause the XR device to download such scripts and data bundles upon a triggering event. The triggering event can be, for example, the display of the prefetched metadata, a threshold time period elapsing from which the prefetched metadata is displayed, a threshold distance between the representation of the user and the virtual rendering associated with asset access (which, for example, can be smaller than the threshold distance to display the prefetched metadata), etc. In some implementations, process 500 can cause the XR device to download such scripts and data bundles upon application of a machine learning model trained to predict whether the user is likely to access the asset (e.g., walk through a portal) based on past interactions of the user or similarly situated users.

In implementations in which the asset is a virtual world, process 500 can obtain user entitlements with respect to one or more virtual objects to be brought into the virtual world on the XR interface. Similar to that described above with respect to user entitlements on a 2D interface, the user entitlements can be parameters by which one or more virtual objects can move between virtual worlds when a user is moving from one virtual world to another on an XR interface. For example, when a user desires to enter a new virtual world with virtual objects available in another virtual world (e.g., a user requests access to a new virtual world as an asset with existing virtual objects), process 500 can determine whether the virtual objects are legitimate, and use this information to authenticate the virtual objects for the new virtual world.

In some implementations, at block 518, process 500 can receive an implicit or explicit selection by the user to access the asset after facilitating presentation of the prefetched metadata, such as by the user selecting the virtual rendering of a portal, e.g., an audible instruction, a gesture, moving through the portal, a selection of the virtual portal, etc. In some implementations, process 500 can automatically render the asset on the XR interface when a presentation of the user approaches a threshold distance of the portal or other virtual object signifying travel to the asset. In some implementations, this threshold distance can be smaller than the threshold distance used to determine whether to display the prefetched metadata associated with the asset. In some implementations, process 500 can render the asset when a representation of the user walks through the virtual rendering of the portal toward the asset.

At block 520, process 500 can facilitate rendering of the asset on the XR interface. In implementations in which the URL specifies an intent, process 500 can map the dynamic component specified by the intent to the asset. For example, if a virtual meeting has a specific set of participants, process 500 can map those participants to the virtual meeting, and display avatars representing those participants attending the virtual meeting.

In implementations in which the asset is a virtual world and process 500 obtains user entitlements, process 500 can facilitate rendering of the asset with the one or more virtual objects, based on the user entitlements, on the XR interface. In some implementations, process 500 can facilitate modification of the asset based on the user entitlements. For example, process 500 can facilitate modification and/or removal of virtual objects within a destination world based on whether the virtual objects are available in the destination virtual world and in what instances; and/or features, characteristics, and/or abilities of the virtual objects within the destination virtual world, similar to that described above with respect to user entitlements on a 2D interface.

In some implementations, process 500 can facilitate preloading of the asset for the XR interface prior to switching to the XR interface as described above. Thus, process 500 can facilitate automatic and immediate rendering of the asset in the XR environment upon the user's implicit or explicit instruction to do so.

Figure 6:
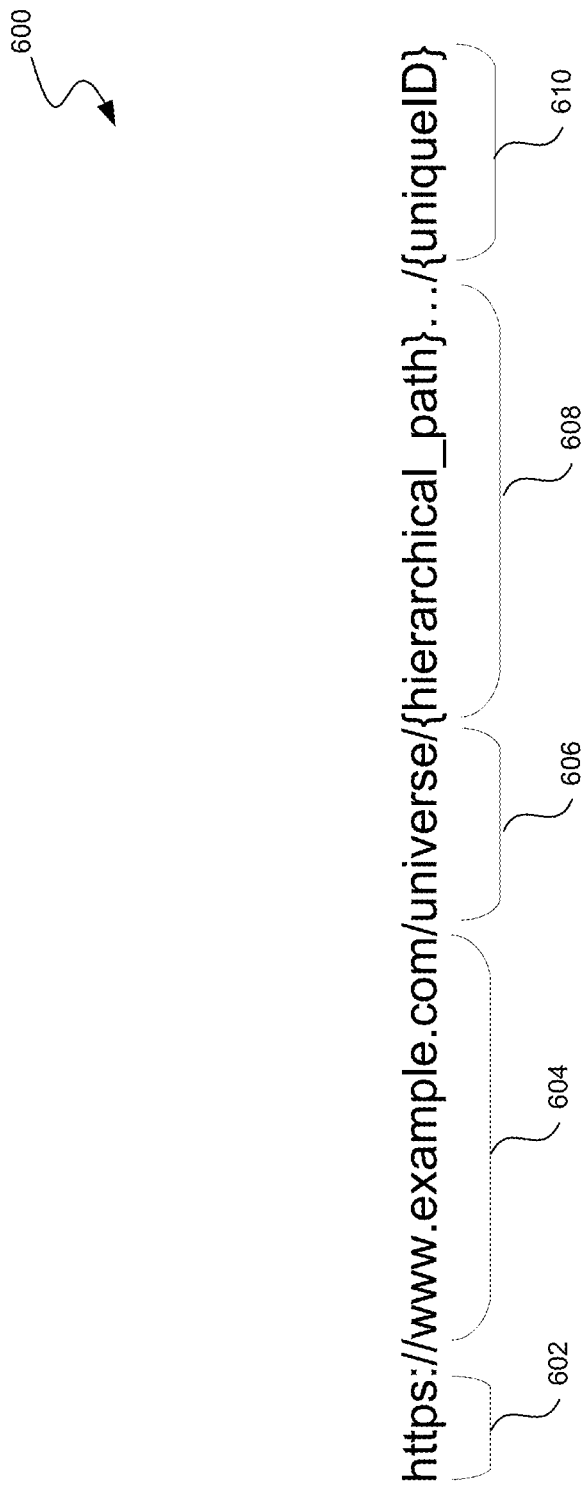
FIG. 6 is a conceptual diagram illustrating an exemplary URL that can provide access to an asset within an artificial reality universe on both a 2D interface and an artificial reality interface according to some implementations.

FIG. 6 is a conceptual diagram illustrating an exemplary URL 600 that can provide access to an asset within an XR universe on both a 2D and an XR interface according to some implementations. The URL 600 can represent an address of the asset where the asset can be located or retrieved. The URL 600 can include a scheme 602 (e.g., "https") indicating the set protocol that a browser must use to retrieve the asset (e.g., the process for exchanging data on a network). The URL 600 can include an authority 604, including a domain indicating which host server is being requested (e.g., "www.example.com"). The URL 600 can specify a universe 606 ("/universe/") indicating the XR universe within which the asset exists. The URL 600 can further include a path 608 to the asset, such as a semantically meaningful hierarchical structure of the location of the asset within the XR universe ("/universe/{hierarchical_path} . . . /"). In one example, the hierarchical path can include a virtual world within the XR universe and a virtual room within the virtual world, e.g., "/universe/world/room". In some implementations, the URL can further include an intent 610 represented by a unique ID ("{uniqueID}", e.g., "8427595"), the intent 610 specifying a dynamic component of the asset. For example, the intent 610 can identify a party, a timely event, an invitation for a specific group of users, or any dynamic or variable content that is not constant across multiple instances of the asset.

Figure 7A:
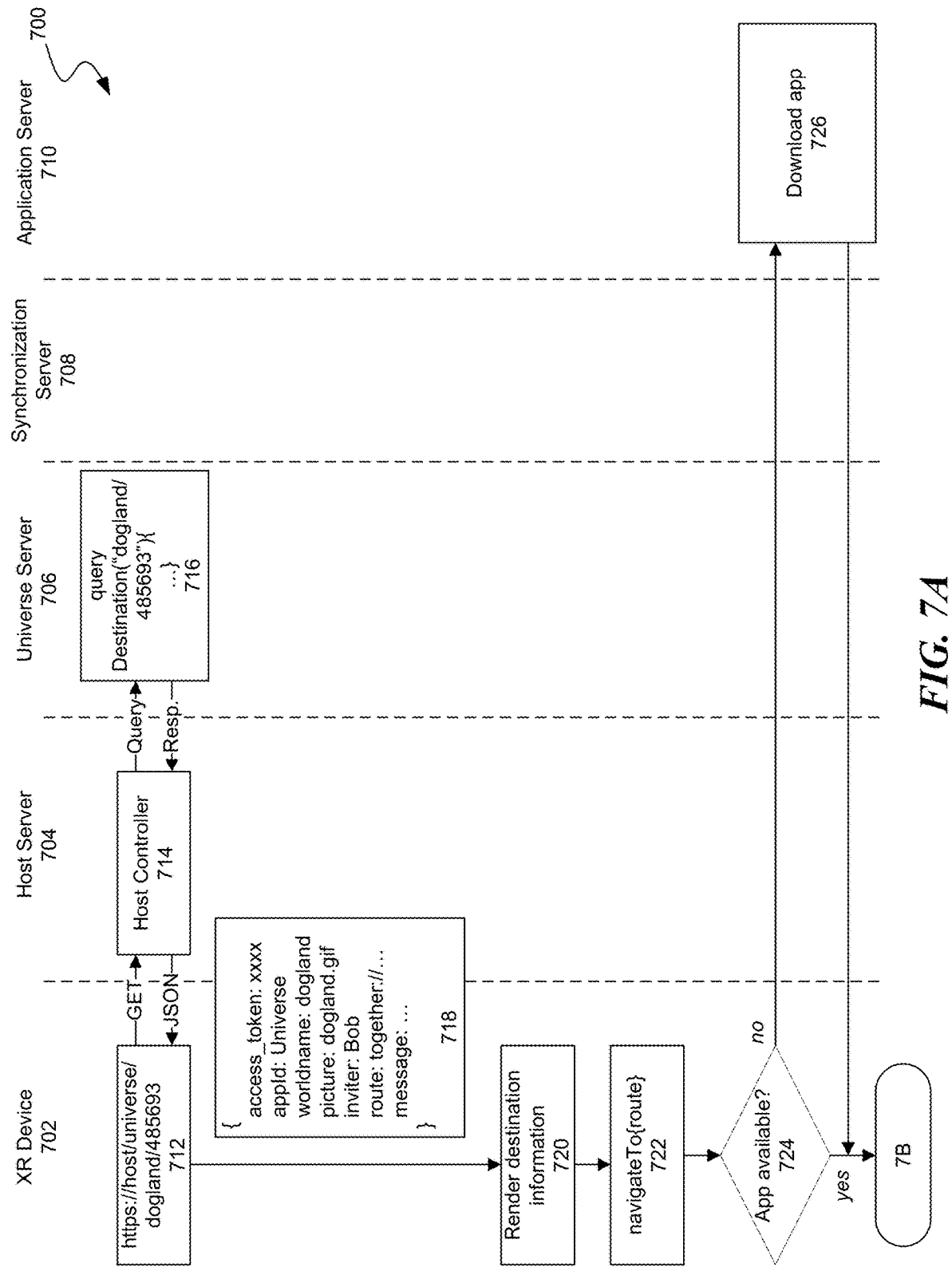
FIGS. 7A and 7B are a flow diagrams illustrating a process used in some implementations of the present technology for providing access to an asset within an artificial reality universe on an artificial reality interface.
Figure 7B:
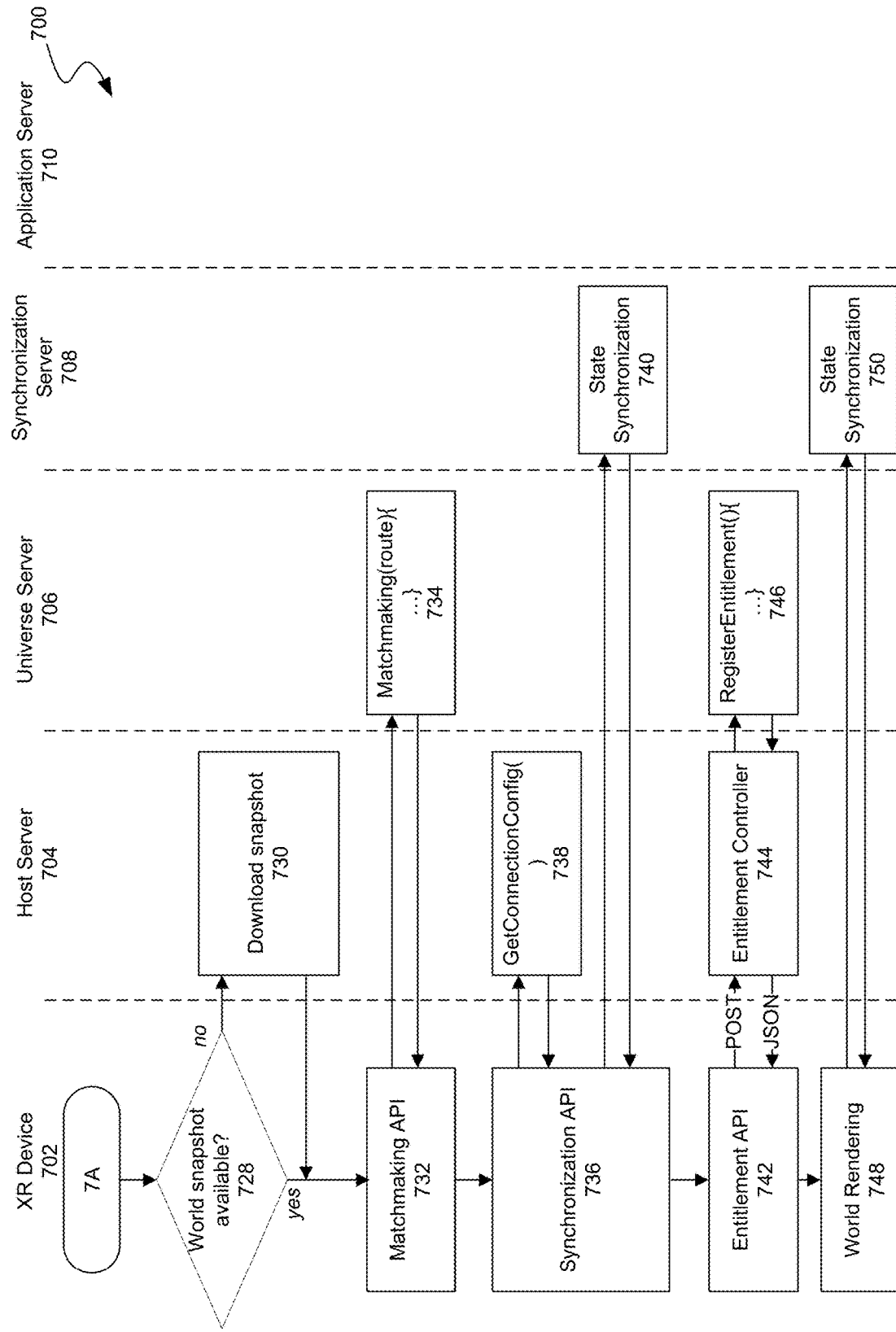

FIGS. 7A-7B are flow diagrams illustrating a process 700 used in some implementations of the present technology for providing access to an asset within an XR universe on an XR interface. Process 700 can be performed by an XR device 702, a host server 704, a universe server 706, a synchronization server 708, and an application server 710. XR device 702 can be any suitable XR device or component of an XR system, such as an HMD (e.g., HMD 200 of FIG. 2A or HMD 250 of FIG. 2B), and/or a separate processing component associated with an HMD. Host server 704 can be a standard remotely accessible web server that hosts websites and/or other web-based data, services, and applications. Universe server 706 can be a server hosting the universe and related data called by XR device 702. Synchronization server 708 can be a server providing state synchronization services for XR device 702. Application server 710 can be a server providing access to application downloads (or data needed to execute applications) that are not available locally on XR device 702.

As shown in FIG. 7A, XR device 702 can receive a request to access URL 712, e.g., "https://host/universe/dogland/485693". In some implementations, XR device 702 can parse metadata received with the request to determine that it was sent from an XR device within an XR universe. For example, the URL 712 can have a unique header indicating that it was received from an XR interface, and in some implementations, can have an adjacent payload identifying the protocol over which to communicate with XR device 702.

XR device 702 can parse URL 712 to identify host server 704, and send a "GET" command to host controller 714 at host server 704. As appreciated by one skilled in the art, "GET" is a method by which XR device 702 requests and retrieves data from host server 704. Host controller 714 can further parse URL 712 to identify universe server 706, and send a query 716 (e.g., a fetch command) to universe server 706 for information associated with the destination specified by URL 712. Universe server 706 can send a response to host controller 714. Host controller 714 can translate the response into a data interchange format (e.g., JavaScript Object Notation ("JSON") or any other suitable format) and transmit it back to XR device 702 in the form of prefetched metadata 718. Using prefetched metadata 718, XR device 702 can render destination information 720 and display it to the user of XR device 702. In some implementations, XR device 702 can display the prefetched metadata in association with a rendering of a gateway or portal door.

XR device 702 can receive a selection 722 (e.g., by the user of XR device 702) to continue to the destination and generate a command (i.e., navigateTo{route}). XR device 702 can determine at block 724 whether the application associated with the destination is available locally to XR device 702, e.g., by querying local storage for the application. If the application is not available, XR device 702 can transmit a request for the application to application server 710, and can download the application at block 726. Once the application is downloaded, or if the application is already available locally, process 700 can continue to block 728 of FIG. 7B.

At block 728, XR device 702 can determine if a world snapshot is available. If the world snapshot is not available, process 700 can continue to block 730, and XR device 702 can download the snapshot from the host server 704. Once the snapshot is downloaded, or if the snapshot is already available, process 700 can display the world snapshot in some implementations, or store it for future rendering when XR device 702 continues to the virtual world. Process 700 can continue to block 732.

At block 732, XR device 702 can execute a matchmaking API. The matchmaking API can send a command 734 to universe server 706 to resolve the intent identified in the URL 712 with the world. Because the intent is dynamic, its location within the XR universe can change. Thus, the matchmaking API can call universe server 706 to identify the location associated with the intent just prior to rendering the world.

At block 736, XR device 702 can execute a synchronization API. The synchronization API can transmit a request 738 to host server 704 to get connection configuration information for the synchronization server 708. The synchronization API can establish a connection with synchronization server 708. At block 740, synchronization server 708 can perform state synchronization to ensure that the local version of the virtual world is the same as the version existing in the universe.

At block 742, XR device 702 can execute an entitlement API. The entitlement API can obtain user entitlements with respect to one or more virtual objects to be brought into the virtual world. The user entitlements can be parameters by which one or more virtual objects can move between virtual worlds when a user is moving from one virtual world to another. For example, the entitlement API can transmit a "POST" command to entitlement controller 744 at host server 704. As understood by one skilled in the art, "POST" is a method that can request that host server 704 accept data enclosed with the request for storage or further action. In this example, the entitlement API can transmit data indicative of which virtual objects are being brought into the virtual world to entitlement controller 744. The entitlement API can translate this data into a format readable by universe server 706 and transmit a command 746 to universe server 706 to authenticate the virtual objects and/or register the applicable entitlements with universe server 706. Universe server 706 can respond to entitlement controller 744 with data indicating whether the virtual objects are legitimate; whether the virtual objects are available in the virtual world and in what instances; and/or features, characteristics, and abilities of the virtual objects within the virtual world. Entitlement controller 744 can convert the response data into a format readable by XR device 702, e.g., JSON or any other suitable format, and transmit it to XR device 702 via the entitlement API. The entitlement API can receive the response data and use it to authenticate and/or modify the virtual objects for the virtual world.

At block 748, the XR device 702 can display the world rendering. The XR device 702 can then render the asset with the one or more virtual objects, based on the user entitlements, on the XR interface. Prior to, during, or after rendering the virtual world, XR device 702 can again establish communication with synchronization server 708. At block 750, synchronization server 708 can perform state synchronization to ensure that the rendered version of the virtual world is the same as the version existing in the universe. Although described herein with respect to a virtual world, it is contemplated that process 700 can be performed similarly for other assets existing in an XR universe, such as objects or events.

Figure 8:
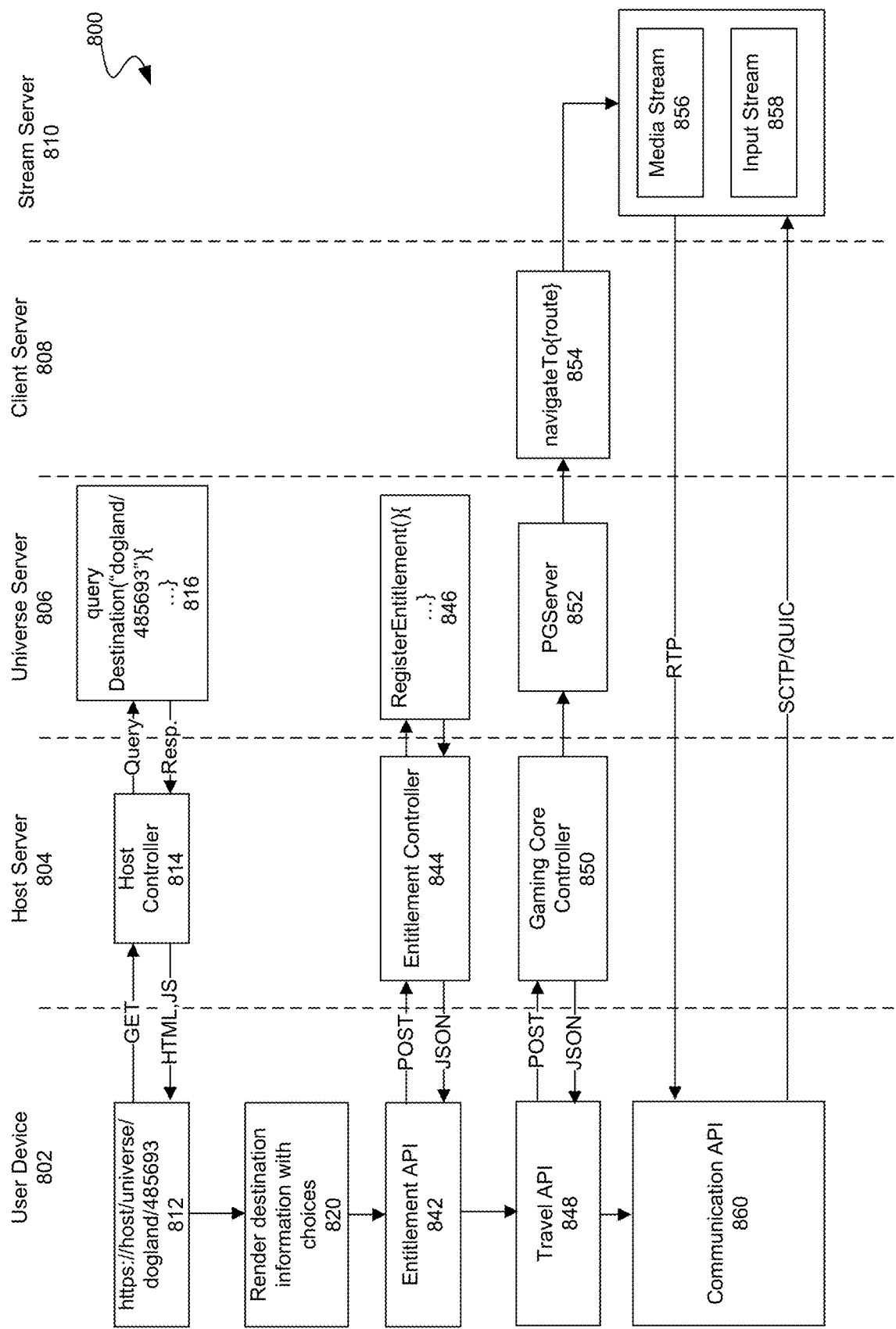
FIG. 8 is a flow diagram illustrating a process used in some implementations of the present technology for providing access to an asset within an artificial reality universe accessed via a 2D interface.

FIG. 8 is a flow diagram illustrating a process 800 used in some implementations of the present technology for providing access to an asset within an XR universe for a 2D interface. Process 800 can be performed by a user device 802, a host server 804, a universe server 806, a client server 808, and a stream server 810. User device 802 can be any suitable 2D interface, surface, device, or component of 2D system, such as web browser, mobile application, etc. Host server 804 can be a standard remotely accessible web server that hosts websites and/or other web-based data, services, and applications. Universe server 806 can be a server hosting the universe and related data called by user device 802. Client server 808 can be a server hosting the asset, such as a server associated with a virtual world. Stream server 810 can be a server that can provide a streaming service for the asset to the user device 802.

As shown in FIG. 8, user device 802 can receive a request to access URL 812, e.g., "https://host/universe/dogland/ 485693". In some implementations, user device 802 can parse metadata received with the request to determine that it was sent from a 2D device within an XR universe. For example, the URL 812 can have a unique header indicating that it was received from a 2D interface, and in some implementations, can have an adjacent payload identifying the protocol over which to communicate with user device 802.

User device 802 can parse URL 812 to identify host server 804, and send a "GET" command to host controller 814 at host server 804. As appreciated by one skilled in the art, "GET" is a method by which user device 802 can request and retrieve data from host server 804. Host controller 814 can further parse URL 812 to identify universe server 806, and send a query 816 (e.g., a fetch command) to universe server 806 for information associated with the destination specified by URL 812. Universe server 806 can send a response to host controller 814. Host controller 814 can translate the response into a data interchange format (e.g., HTML, JavaScript (JS), or other suitable format) and transmit it back to user device 802 in the form of destination information, i.e., prefetched metadata. In some implementations, the prefetched metadata can be similar to prefetched metadata 718 of FIG. 7A.

At block 820, user device 802 can render the destination information with choices. For example, user device 802 can present a landing page describing the destination. In some implementations, the landing page can include at least some of the prefetched metadata, e.g., the destination (e.g., a world type), the destination snapshot (e.g., a preview of the destination as rendered on the 2D interface), and a description of the destination. From the landing page, the user can select to view the destination from the 2D interface or instead to switch to an XR interface. However, in some implementations, the destination information can be rendered without an explicit choice to proceed on the 2D interface or to switch to the XR interface. For example, user device 802 can automatically switch to the XR interface upon detection of activation of an XR device (e.g., an HMD), as described further herein with respect to FIG. 9.

At block 842, user device 802 can execute an entitlement API. The entitlement API can execute a set of functions for performing entitlement verification using any suitable scripting language, such as JavaScript. Similar to block 742 of FIG. 7B, the entitlement API can obtain user entitlements with respect to one or more virtual objects to be brought into the virtual 2D world when the asset is a virtual world. The user entitlements can be parameters by which one or more virtual objects can move between virtual 2D worlds when a user is moving from one virtual world to another. For example, the entitlement API can transmit a "POST" command to entitlement controller 844 at host server 804. As understood by one skilled in the art, "POST" is a method that can request that host server 804 accept data enclosed with the request for storage or further action. In this example, the entitlement API can transmit data indicative of which virtual objects are being brought into the virtual world to entitlement controller 844. The entitlement API can translate this data into a format readable by universe server 806 and transmit a command 846 to universe server 806 to authenticate the virtual objects and/or register the applicable entitlements with universe server 806. Universe server 806 can respond to entitlement controller 844 with data indicating whether the virtual objects are legitimate; whether the virtual objects are available in the virtual world and in what instances; and/or features, characteristics, and abilities of the virtual objects within the virtual world. Entitlement controller 844 can convert the response data into a format readable by user device 802, e.g., JSON or any other suitable format, and transmit it to user device 802 via the entitlement API. The entitlement API can receive the response data and use it to authenticate and/or modify the virtual objects for the virtual world. Process 800 can continue to block 848.

At block 848, user device 802 can execute a travel API. The travel API can perform a "POST" request to gaming core controller 850 of host server 804 to begin travel to the destination world. Gaming core controller 850 can acknowledge the request in a format readable by user device 802, e.g., JSON or any other suitable format. Gaming core controller 850 can transmit a request to begin travel to an open source server, e.g., a Postgres ("PG") server 852, collocated with or being integral with universe server 806. PG server 852 can translate the request into a command 854 to client server 808 (i.e., navigateTo{route}), which can be used to navigate to stream server 810.

After execution of the travel API, process 800 can continue to block 860. At block 860, user device 802 can execute a communication API. The communication API can be implemented with, for example, JavaScript and Web Real-Time Communication (WebRTC), or any other suitable protocol that can allow user device 802 to stream audio and/or video media, and to exchange data directly with stream server 810. The communication API can use various communications protocols to transport an input stream 858 of data representing actions taken by user device 802. For example, the communication API can use Stream Control Transmission Protocol (SCTP) and Quick UDP Internet Connections (QUIC). Based on input stream 858, stream server 810 can generate media stream 856 rendering the asset and transport it to user device 802 using any suitable protocol, such as Real-Time Transport Protocol (RTP). Although described herein with respect to a virtual world, it is contemplated that process 800 can be performed similarly for other assets existing in an XR universe, such as objects or events.

Figure 9:
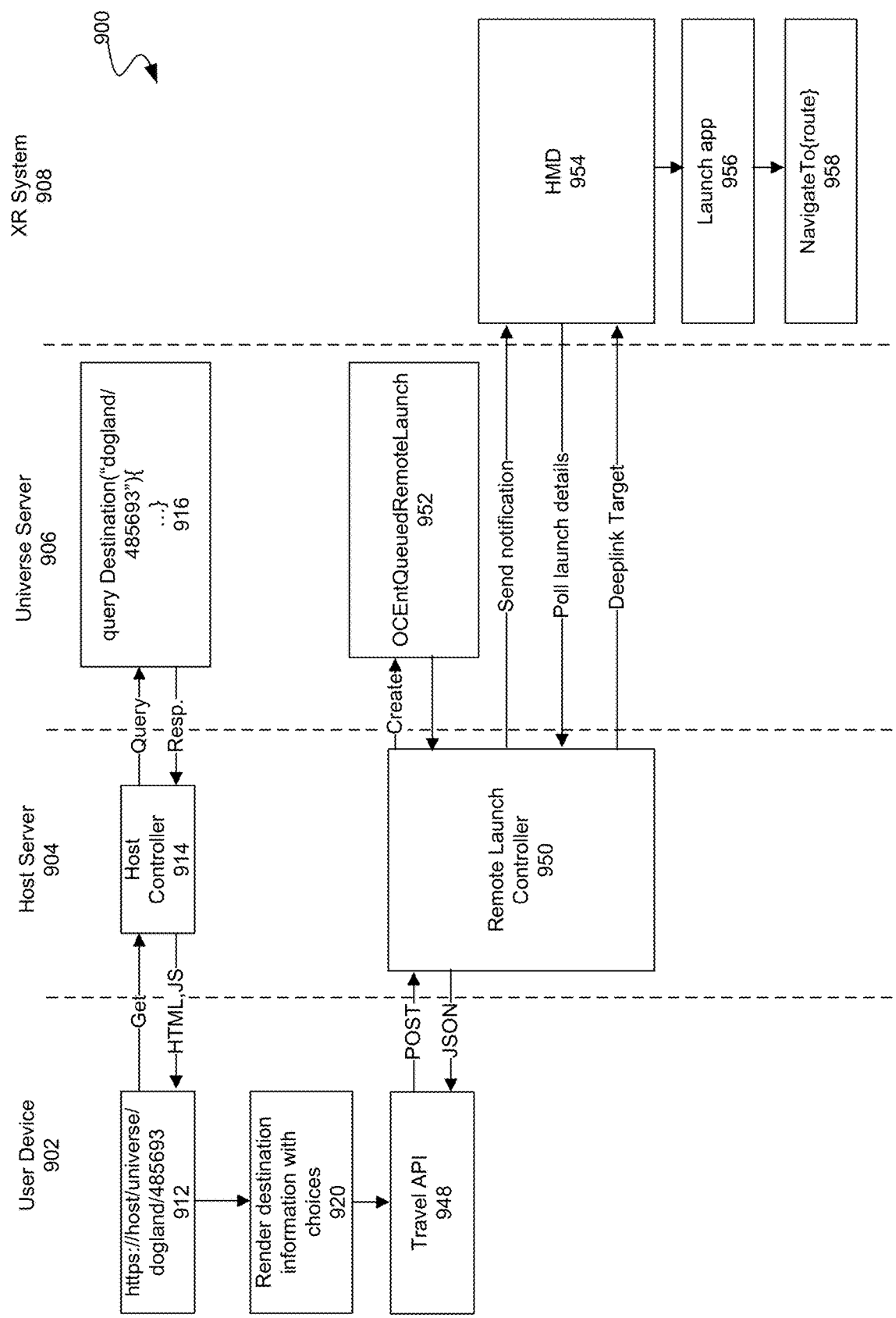
FIG. 9 is a flow diagram illustrating a process used in some implementations of the present technology for providing access to an asset within an artificial reality universe on an artificial reality interface when the asset was initially requested from a 2D interface.

FIG. 9 is a flow diagram illustrating a process 900 used in some implementations of the present technology for providing access to an asset within an XR universe from an XR interface when the asset was initially requested from a 2D interface. Process 900 can be performed by a user device 902, a host server 904, a universe server 906, and an XR system 908. User device 902 can be any suitable 2D surface device or component of 2D system, such as a web browser, mobile application, etc. Host server 904 can be a standard remotely accessible web server that hosts websites and/or other web-based data, services, and applications, and may be similar to or different than host server 704 of FIGS. 7A-B or host server 804 of FIG. 8. Universe server 806 can be a server hosting the XR universe and related data called by user device 802, and can be similar to or different than universe server 706 of FIGS. 7A-B or universe server 806 of FIG. 8. XR system 908 can be any suitable XR device or component of an XR system, or any combination thereof, such as an HMD (e.g., HMD 200 of FIG. 2A or HMD 250 of FIG. 2B), and/or a separate processing component associated with an HMD, and can include and/or be similar to XR device 702 of FIGS. 7A-7B.

As shown in FIG. 9, user device 902 can receive a request to access URL 912, e.g., "https://host/universe/dogland/485693". User device 902 can parse URL 912 to identify host server 904, and send a "GET" command to host controller 914 at host server 904. Host controller 914 can further parse URL 912 to identify universe server 906, and send a query 916 (e.g., a fetch command) to universe server 906 for information associated with the destination specified by URL 912. Universe server 906 can send a response to host controller 914. Host controller 914 can translate the response into a data interchange format (e.g., HTML, JavaScript (JS), or any other suitable format) and transmit it back to user device 902 in the form of destination information, i.e., prefetched metadata. In some implementations, the prefetched metadata can be similar to prefetched metadata 718 of FIG. 7A.

At block 920, user device 902 can render destination information with choices. For example, user device 902 can present a landing page describing the destination. In some implementations, the landing page can include at least some of the prefetched metadata, e.g., the destination (e.g., a world type), the destination snapshot (e.g., a preview of the destination as rendered on the 2D interface), and a description of the destination. In this example, the user can select to switch from the 2D interface to the XR interface. Such a selection can be explicit (e.g., the user of user device 902 selects an option to switch to the XR interface from the landing page), or implicit (e.g., upon detection of activation or donning of an XR device associated with the user, such as an HMD).

At block 948, user device 902 can execute a travel API. The travel API can perform a "POST" request to remote launch controller 950 of host server 904 to begin travel to the destination world on an XR interface. Remote launch controller 950 can acknowledge the request in a format readable by user device 902, e.g., JSON or any other suitable format. Remote launch controller 950 can create a request 952 transmitted to universe server 906 to begin travel on XR system 908 instead of user device 902. XR system 908 can include HMD 954 (e.g., HMD 200 of FIG. 2A or HMD 250 of FIG. 2B). Universe server 906 can respond with a deep link associated with the asset.

Upon activation of HMD 954, remote launch controller 950 can send a notification of the remote launch to HMD 954. HMD 954 can poll remote launch controller 950 for launch details, such as the resources needed by HMD 954 to perform the launch. Remote launch controller 950 can transmit the deep link representing the target (i.e., the asset) to HMD 954, the deep link being a direct link to the destination. At block 956, HMD 954 can launch the application, and at block 958, HMD 954 can continue to the destination (i.e., navigateTo{route}), the route being specified by the deep link. Although described herein with respect to a virtual world, it is contemplated that process 900 can be performed similarly for other assets existing in an XR universe, such as objects or events.

Figure 10:
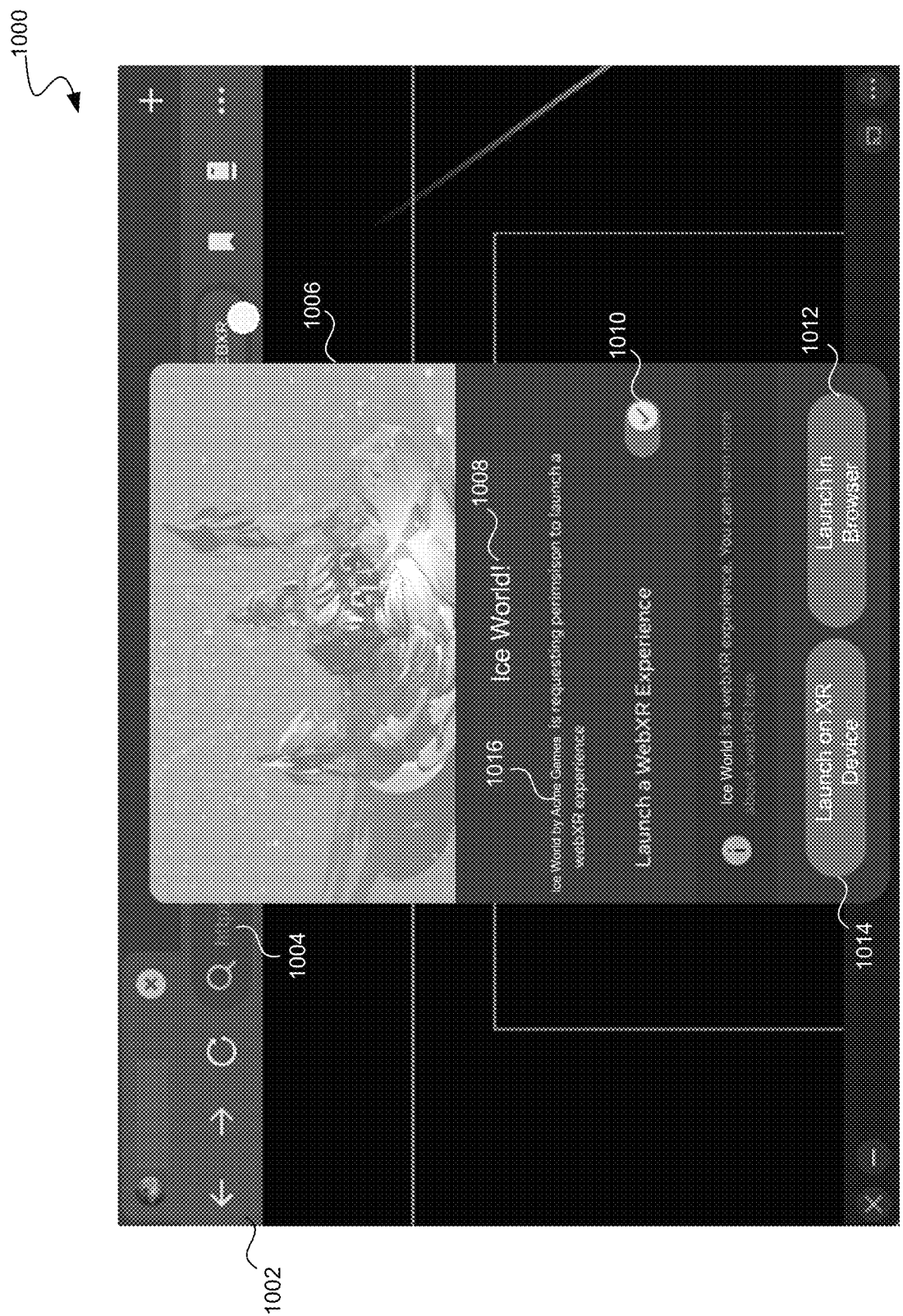
FIG. 10 is a conceptual diagram illustrating an exemplary landing page including information about the asset that is presented before rendering the asset in some implementations of the present technology.

FIG. 10 is a conceptual diagram illustrating an exemplary landing page 1000 including information about the asset (e.g., metadata) that is presented before rendering the asset in some implementations of the present technology. To reach landing page 1000, a user on a 2D interface (i.e., web browser 1002) entered a URL 1004, e.g., "https://www.example.com/universe/iceworld/468421", on the web browser 1002. As described herein with respect to FIGS. 8 and 9, web browser 1002 can identify a host server with which URL 1004 is associated, and direct the URL to the host server. The host server can further parse the URL to determine a universe server identified by the URL, and pass URL 1004 (or any portion thereof) to the universe server. The universe server can return to web browser 1002, via the host server, metadata associated with an asset identified by URL 1004, and web browser 1002 can render landing page 1000 using the metadata.

As shown in FIG. 10, landing page 1000 can include metadata such as a title of the asset 1008 (i.e., "Ice World"), a snapshot of the asset (i.e., a graphical rendering of Ice World), and an identification of the source of the asset 1016. Landing page 1000 can further include an option to continue to the asset (e.g., via toggle 1010). Selecting to continue to the asset via toggle 1010 can cause landing page 1000 to further display an option 1012 to continue to the asset in web browser 1002 and an option 1014 to instead launch the asset on an XR device. As described further above with respect to block 510 of FIG. 5, the determination of whether the asset will be accessed from the web browser 1002 or the XR device can be made explicitly through landing page 1000 by selecting option 1012 or option 1014, or can be made implicitly when the user dons or activates an XR device.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for providing access to a virtual world within an artificial reality universe using a single uniform resource locator (URL) for both a 2D interface and an artificial reality interface, the method comprising:
   receiving, at a computing system, a first request to access the virtual world via the URL activated from the 2D interface;
   in response to the first request being received from the 2D interface:
      prefetching metadata associated with the virtual world;
      transmitting the prefetched metadata to the 2D interface, wherein the 2D interface displays at least some of the prefetched metadata; and
      receiving a selection to either access the virtual world from the 2D interface or to switch to the artificial reality interface;
      wherein when the received selection is to access the virtual world from the 2D interface, the 2D interface renders the virtual world; and
      wherein when the received selection is to switch to the artificial reality interface, the artificial reality interface renders the virtual world;
   receiving, at the computing system, a second request to access the virtual world via the URL activated from the artificial reality interface; and
   in response to the second request being received from the artificial reality interface:
      prefetching the metadata, regarding the virtual world;
      transmitting the prefetched metadata to the artificial reality interface, wherein the artificial reality interface is part of a first electronic device which is different than a second electronic device of which the 2D interface is part, and wherein the artificial reality interface displays at least some of the prefetched metadata; and
      obtaining user entitlements with respect to one or more virtual objects to be brought into the virtual world;
      wherein the artificial reality interface renders the virtual world with the one or more virtual objects, based on the user entitlements.

2. The method of claim 1, wherein when the first request is received from the 2D interface, the selection to switch to the artificial reality interface includes detecting activation or donning of an artificial reality device.

3. The method of claim 1, wherein, further in response to the first request being received from the 2D interface, the 2D interface displays the at least some of the prefetched metadata via a landing page including an option to either access the virtual world from the 2D interface or to switch to the artificial reality interface; and
wherein the selection is received via the landing page.

4. The method of claim 1, wherein, before receiving the selection to either access the virtual world from the 2D interface or to switch to the artificial reality interface, the artificial reality interface downloads scripts and data bundles needed to render the virtual world on the artificial reality interface, and the 2D interface downloads scripts and data bundles needed to render the virtual world on the 2D interface.

5. The method of claim 1, wherein the URL specifies a dynamic component of the virtual world, the dynamic component being a changeable feature of the virtual world; and
wherein the artificial reality interface renders the virtual world by mapping the dynamic component to the virtual world.

6. The method of claim 1, wherein, when the received selection is to access the virtual world from the 2D interface, the method further comprises:
   obtaining the user entitlements with respect to the one or more virtual objects to be brought into the virtual world;
   wherein the 2D interface renders the virtual world with the one or more virtual objects, based on the user entitlements.

7. A non-transitory computer-readable storage medium storing instructions that, when executed by a computing system, cause the computing system to perform a process for providing access to an asset within an artificial reality universe using a single uniform resource locator (URL) for both a 2D interface and an artificial reality interface, the process comprising:
   receiving a first request, for the asset, via the URL accessed from the 2D interface and in response:
      prefetching metadata associated with the asset;
      transmitting the prefetched metadata to the 2D interface, wherein the 2D interface displays the at least some of the prefetched metadata; and
      receiving a selection to either access the asset from the 2D interface or to switch to the artificial reality interface;
      wherein when the received selection is to access the asset from the 2D interface, the 2D interface renders the asset; and
      wherein when the received selection is to switch to the artificial reality interface, the artificial reality interface renders the asset; and
   receiving a second request, for the asset, via the URL accessed from the artificial reality interface and in response:
      prefetching the metadata regarding the asset; and
      transmitting the prefetched metadata to the artificial reality interface;
      transmitting the prefetched metadata to the artificial reality interface, wherein the artificial reality interface is part of a first electronic device which is different than a second electronic device of which the 2D interface is part, and;
      wherein the artificial reality interface displays at least some of the prefetched metadata; and
      wherein the artificial reality interface renders the asset.

8. The non-transitory computer-readable storage medium of claim 7,
wherein the asset is a virtual world; and
wherein, further in response to the second request being received from the artificial reality interface, the process further comprises:
obtaining user entitlements with respect to one or more virtual objects to be brought into the virtual world;
wherein the artificial reality interface renders the virtual world with the one or more virtual objects, based on the user entitlements.

9. The non-transitory computer-readable storage medium of claim 7,
wherein, when the first request is received from the 2D interface, the selection to switch to the artificial reality interface includes detecting activation or donning of an artificial reality device.

10. The non-transitory computer-readable storage medium of claim 7,
wherein, further in response to the first request being received from the 2D interface, the 2D interface displays the at least some of the prefetched metadata via a landing page including an option to either access the asset from the 2D interface or to switch to the artificial reality interface; and
wherein the selection is received via the landing page.

11. The non-transitory computer-readable storage medium of claim 7,
wherein before receiving the selection to either access the asset from the 2D interface or to switch to the artificial reality interface, the artificial reality interface downloads scripts and data bundles needed to render the asset on the artificial reality interface, and the 2D interface downloads scripts and data bundles needed to render the asset on the 2D interface.

12. The non-transitory computer-readable storage medium of claim 7,
wherein the URL specifies a dynamic component of the asset, the dynamic component being a changeable feature of the asset; and
wherein the artificial reality interface renders the asset by mapping the dynamic component to the asset.

13. The non-transitory computer-readable storage medium of claim 7,
wherein the asset is a virtual world; and
wherein, when the received selection is to access the asset from the 2D interface, the process further comprises:
obtaining user entitlements with respect to one or more virtual objects to be brought into the virtual world;
wherein the 2D interface renders the virtual world with the one or more virtual objects, based on the user entitlements.

14. The non-transitory computer-readable storage medium of claim 7,
wherein the URL includes a hierarchical path of a location of the asset within the artificial reality universe; and
wherein the hierarchical path specifies a virtual world within the artificial reality universe and a virtual room within the virtual world.

15. A computing system for providing access to an asset within an artificial reality universe using a single uniform resource locator (URL) for both a 2D interface and an artificial reality interface, the computing system comprising:
one or more processors; and
one or more memories storing instructions that, when executed by the one or more processors, cause the computing system to perform a process comprising:
receiving a first request to access the asset via the URL accessed from the 2D interface;
in response to the first request:
prefetching metadata associated with the asset;
transmitting the prefetched metadata to the 2D interface, wherein the 2D interface displays the prefetched metadata; and
receiving a selection to either access the asset from the 2D interface or to switch to the artificial reality interface;
wherein when the received selection is to access the asset from the 2D interface, the 2D interface renders the asset; and
wherein when the received selection is to switch to the artificial reality interface, the artificial reality interface renders the asset;
receiving a second request to access the asset via the URL accessed from the artificial reality interface; and
in response to the second request:
prefetching the metadata regarding the asset; and
transmitting the prefetched metadata to the artificial reality interface;
transmitting the prefetched metadata to the artificial reality interface, wherein the artificial reality interface is part of a first electronic device which is different than a second electronic device of which the 2D interface is part;
wherein the artificial reality interface displays the prefetched metadata; and
wherein the artificial reality interface renders the asset.

16. The computing system of claim 15,
wherein the asset is a virtual world; and
wherein, further in response to the second request being received from the artificial reality interface, the process further comprises:
obtaining user entitlements with respect to one or more virtual objects to be brought into the virtual world,
wherein the artificial reality interface renders the virtual world with the one or more virtual objects, based on the user entitlements.

17. The computing system of claim 15,
wherein when the first request is received from the 2D interface, the selection to switch to the artificial reality interface includes detecting activation or donning of an artificial reality device.

18. The computing system of claim 15,
wherein, further in response to the first request being received from the 2D interface, the 2D interface displays the at least some of the prefetched metadata via a landing page including an option to either access the asset from the 2D interface or to switch to the artificial reality interface; and
wherein the selection is received via the landing page.

19. The computing system of claim 15,
wherein the URL specifies a dynamic component of the asset, the dynamic component being a changeable feature of the asset; and
wherein the artificial reality interface renders the asset by mapping the dynamic component to the asset.

20. The computing system of claim 15,
wherein the URL includes a hierarchical path of a location of the asset within the artificial reality universe; and wherein the hierarchical path specifies a virtual world within the artificial reality universe and a virtual room within the virtual world.

\* \* \* \* \*